(12) United States Patent
Ying et al.

(10) Patent No.: US 11,800,481 B2
(45) Date of Patent: Oct. 24, 2023

(54) COMMUNICATION METHOD AND COMMUNICATION APPARATUS

(71) Applicant: HUAWEI TECHNOLOGIES CO., LTD., Shenzhen (CN)

(72) Inventors: Jiangwei Ying, Beijing (CN); Yanmei Yang, Beijing (CN); Meng Li, Beijing (CN); Dario Serafino Tonesi, Berlin (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 63 days.

(21) Appl. No.: 16/988,927

(22) Filed: Aug. 10, 2020

(65) Prior Publication Data
US 2020/0374828 A1 Nov. 26, 2020

Related U.S. Application Data

(63) Continuation of application No. PCT/CN2019/073935, filed on Jan. 30, 2019.

(30) Foreign Application Priority Data

Feb. 13, 2018 (CN) .......................... 201810150252.0

(51) Int. Cl.
*H04W 60/04* (2009.01)
*H04W 4/40* (2018.01)
(Continued)

(52) U.S. Cl.
CPC ........... *H04W 60/04* (2013.01); *H04W 4/021* (2013.01); *H04W 4/40* (2018.02); *H04W 84/042* (2013.01)

(58) Field of Classification Search
CPC ..... H04W 60/04; H04W 4/40; H04W 84/042; H04W 4/00; H04W 4/021; H04W 4/46;
(Continued)

(56) References Cited

U.S. PATENT DOCUMENTS 10,206,076 B2 * 2/2019 Chun ...................... H04W 4/12
2013/0099941 A1 4/2013 Jana et al.
(Continued)

FOREIGN PATENT DOCUMENTS

CN 104272834 A 1/2015
CN 105282257 A 1/2016
(Continued)

OTHER PUBLICATIONS

Yao Junfeng, A Research on Key Technologies of Traffic Information Service Cooperation Based on Internet of Vehicles. Chang"an University, 2016, 1 page.
(Continued)

*Primary Examiner* — Mohamed A. Wasel
*Assistant Examiner* — John Fan
(74) *Attorney, Agent, or Firm* — Rimon PC

(57) ABSTRACT

This application discloses a communication method and a communications apparatus. The method includes: receiving, by a mobility management network element, a registration request message from a terminal, where the registration request message is used to request a vehicle-to-everything V2X configuration parameter for the terminal, and the V2X configuration parameter is used by the terminal to perform a V2X service; sending, by the mobility management network element, a parameter request message to a V2X parameter configuration network element based on the registration request message, where the parameter request message is used to request the V2X configuration parameter of the terminal from the V2X parameter configuration network element; and receiving, by the mobility management network element, the V2X configuration parameter from the V2X parameter configuration network element, and sending the V2X configuration parameter to the terminal. Use of this application helps improve security of the V2X service.

20 Claims, 10 Drawing Sheets

(51) Int. Cl.
    *H04W 4/021*     (2018.01)
    *H04W 84/04*     (2009.01)

(58) Field of Classification Search
    CPC ........... H04W 4/44; H04W 4/02; H04W 4/50; H04W 4/06
    USPC ......................................................... 709/227
    See application file for complete search history.

(56) References Cited

U.S. PATENT DOCUMENTS

| | | | |
|---|---|---|---|
| 2017/0279858 A1* | 9/2017 | Atarius | H04L 65/1073 |
| 2017/0288886 A1 | 10/2017 | Atarius et al. | |
| 2017/0295579 A1 | 10/2017 | Sheng | |
| 2018/0159935 A1* | 6/2018 | Cavalcanti | H04W 4/80 |
| 2018/0167790 A1* | 6/2018 | Cavalcanti | H04L 63/0281 |
| 2019/0037448 A1* | 1/2019 | Shan | H04W 60/04 |
| 2019/0335532 A1* | 10/2019 | Kim | H04W 12/06 |

FOREIGN PATENT DOCUMENTS

| | | |
|---|---|---|
| CN | 106027749 A | 10/2016 |
| CN | 106341839 A | 1/2017 |
| CN | 106448254 A | 2/2017 |
| CN | 106488584 A | 3/2017 |
| CN | 106961704 A | 7/2017 |
| CN | 106973438 A | 7/2017 |
| CN | 107027105 A | 8/2017 |
| CN | 107040960 A | 8/2017 |
| CN | 107295644 A | 10/2017 |
| CN | 107683613 A | 2/2018 |
| WO | 2016145589 A1 | 9/2016 |
| WO | 2016190912 A1 | 12/2016 |
| WO | 2016209197 A1 | 12/2016 |
| WO | 2017003405 A1 | 1/2017 |
| WO | 2017011039 A1 | 1/2017 |
| WO | 2017076056 A1 | 5/2017 |
| WO | 2017080782 A1 | 5/2017 |
| WO | WO-2017136627 A1 * | 8/2017 |

OTHER PUBLICATIONS

Huawei, HiSilicon, TS23.501: Clarification for the default QoS flow, notification control and 5QI. SAWG2 Meeting #122Bis, Aug. 21-25, 2017, Sophia Antipolis, France, S2-175610, 13 pages.

Secretary of SA WG2, Draft Report of SA WG2 meetings #119. SA WG2 Meeting #120, Mar. 27-31, 2017, Busan, South Korea, S2-171626, 312 pages.

3GPP TR 23.786 V0.3.0 (Jan. 1, 2018),3rd Generation Partnership Project;Technical Specification Group Services and System Aspects;Study on architecture enhancements for EPS and 5G System to supportadvanced V2X services (Release 16), total 19 pages.

3GPP TS 23.502 V15.0.0 (Jun. 1, 2018),3rd Generation Partnership Project;Technical Specification Group Services and System Aspects;Procedures for the 5G System;Stage 2(Release 15), total 257 pages.

3GPP TS 36.300 V15.2.0 (Jul. 1, 2018),3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 15), total 338 pages.

3GPP TS 23.503 V15.0.0 (Dec. 1, 2017),3rd Generation Partnership Project;Technical Specification Group Services and System Aspects;Policy and Charging Control Framework for the 5G System;Stage 2(Release 15), total 56 pages.

3GPP TS 36.331 V15.0.1 (Sep. 1, 2018),3rd Generation Partnership Project;Technical Specification Group Radio Access Network;Evolved Universal Terrestrial Radio Access (E-UTRA);Radio Resource Control (RRC);Protocol specification(Release 15), total 776 pages.

Huawei, HiSilicon, Discussion on Reliability for Rel-15 EPS based eV2X. SA WG2 Meeting #125, Jan. 22-26, 2018, Gothenburg, Sweden, S2-180149, 5 pages.

3GPP TS 29.503 V0.4.0 (Jan. 2018), 3rd Generation Partnership Project; Technical Specification Group Core Network and Terminals; 5G System; Unified Data Management Services, Stage 3(Release 15), 69 pages.

* cited by examiner

COMMUNICATION METHOD AND COMMUNICATION APPARATUS

CROSS-REFERENCE TO RELATED APPLICATIONS

This application is a continuation of International Application No. PCT/CN2019/073935, filed on Jan. 30, 2019, which claims priority to Chinese Patent Application No. 201810150252.0, filed on Feb. 13, 2018. The disclosures of the aforementioned applications are hereby incorporated by reference in their entireties.

TECHNICAL FIELD

This application relates to the field of communications technologies, and in particular, to a communication method and a communications apparatus.

BACKGROUND

Continuous development of mobile communications technologies brings a wide range of innovative applications to all lines of business and industries. The innovative applications include, for example, mobile broadband, multimedia, machine type communication (MTC for short), industrial control, and intelligent transportation system (ITS for short), which will become main use cases in a 5G era. The wide range of applications relate to a vehicle-to-everything (V2X for short) communications service, and V2X service transmission may be performed between terminals based on a configured V2X parameter.

Currently, a V2X control function entity sends the configured V2X parameter or an updated V2X parameter to a terminal through a V3 interface based on the open mobile alliance-device management (OMA DM for short) protocol. The V2X control function is an application layer function entity, and is usually deployed outside an operator network, for example, deployed by a third-party V2X application. As a result, parameters configured by the operator network for the terminal are easily leaked to a third party, resulting in relatively poor security of the V2X service.

SUMMARY

Embodiments of the present invention provide a communication method and a communications apparatus, to help improve security of a V2X service.

According to a first aspect, a communication method is provided. The method includes: receiving, by a mobility management network element, a registration request message from a terminal; sending a parameter request message to a V2X parameter configuration network element based on the registration request message; and receiving a V2X configuration parameter from the V2X parameter configuration network element, and sending the V2X configuration parameter to the terminal. The registration request message may be used to request the V2X configuration parameter for the terminal, and the V2X configuration parameter may be used by the terminal to perform a V2X service such as V2X communication, and the parameter request message may be used to request the V2X configuration parameter of the terminal from the V2X parameter configuration network element. The V2X parameter configuration network element may be a control plane network element, may be deployed by an operator, and may be located in a 3GPP network, so that the V2X configuration parameter can be managed by using a control plane as opposed to an application layer. This improves security of information about the V2X configuration parameter.

With reference to the first aspect, in a first possible design of the first aspect, the parameter request message includes V2X indication information, and V2X feature information of the terminal; V2X indication information; V2X authorized indication information; V2X feature information of the terminal; or V2X authorized indication information, V2X feature information of the terminal, and the like. The V2X indication information may be used to indicate the V2X parameter configuration network element to return the V2X configuration parameter to the mobility management network element, and the V2X authorized indication information may be used to indicate that the terminal is authorized to use the V2X service and/or the terminal supports the V2X service.

With reference to the first possible design of the first aspect, in a second possible design of the first aspect, the parameter request message includes the V2X feature information; and the sending, by the mobility management network element, a parameter request message to a V2X parameter configuration network element based on the registration request message may be specifically: sending, by the mobility management network element to the V2X parameter configuration network element, the V2X feature information in subscription information of the terminal. This helps the V2X parameter configuration network element determine (allocate and obtain) the V2X configuration parameter for the terminal based on the V2X feature information of the terminal.

With reference to the first aspect, the first possible design of the first aspect, or the second possible design of the first aspect, in a third possible design of the first aspect, the sending, by the mobility management network element, a parameter request message to a V2X parameter configuration network element based on the registration request message may be specifically: when the terminal is authorized to use the V2X service, and the registration request message carries capability indication information used to indicate that the terminal supports the V2X service, sending, by the mobility management network element, the parameter request message to the V2X parameter configuration network element; or when the terminal is authorized to use the V2X service, sending, by the mobility management network element, the parameter request message to the V2X parameter configuration network element. That the terminal is authorized to use the V2X service may mean that a user corresponding to a user identifier of the terminal is authorized to use the V2X service, and that the terminal supports the V2X service may mean that the terminal is a terminal that supports the V2X service. Optionally, the mobility management network element may determine, based on the subscription information of the terminal, whether the terminal is authorized to use the V2X service. Therefore, reliability of a parameter request is improved, and overheads caused by performing a parameter request when the terminal is not authorized to use the V2X service are reduced.

With reference to the first aspect, the first possible design of the first aspect, the second possible design of the first aspect, or the third possible design of the first aspect, in a fourth possible design of the first aspect, the mobility management network element may further send location information of the terminal to the V2X parameter configuration network element, where the location information is used by the V2X parameter configuration network element to determine the V2X configuration parameter of the terminal. This helps the V2X parameter configuration network element determine the V2X configuration parameter for the terminal based on the location information of the terminal.

With reference to the first aspect, the first possible design of the first aspect, the second possible design of the first aspect, the third possible design of the first aspect, or the fourth possible design of the first aspect, in a fifth possible design of the first aspect, the mobility management network element may further send, to the V2X parameter configuration network element, authorized area information in subscription information of the terminal, where the authorized area information may be used by the V2X parameter configuration network element to determine the V2X configuration parameter of the terminal. This helps the V2X parameter configuration network element determine the V2X configuration parameter for the terminal based on the authorized area information of the terminal.

With reference to the first aspect, the first possible design of the first aspect, the second possible design of the first aspect, the third possible design of the first aspect, the fourth possible design of the first aspect, or the fifth possible design of the first aspect, in a sixth possible design of the first aspect, the mobility management network element may further send the V2X feature information of the terminal to the terminal. For example, when sending the V2X configuration parameter to the terminal, the mobility management network element may further send the V2X feature information corresponding to the determined V2X configuration parameter to the terminal together with the V2X configuration parameter. This helps the terminal perform a V2X service based on the V2X feature information and the corresponding V2X configuration parameter. The V2X feature information may be obtained by the mobility management network element, for example, obtained from the subscription information of the terminal. Alternatively, the V2X feature information may be sent by the V2X parameter configuration network element to the mobility management network element. For example, when sending the V2X configuration parameter to the mobility management network element, the V2X parameter configuration network element also sends the V2X feature information to the mobility management network element together with the V2X configuration parameter.

According to a second aspect, a communication method is provided. The method includes: receiving, by a V2X parameter configuration network element, a parameter request message from a mobility management network element; and sending a V2X configuration parameter of a terminal to the mobility management network element based on the parameter request message. The V2X configuration parameter may be used by the terminal to perform a V2X service. The V2X parameter configuration network element may be a control plane network element, may be deployed by an operator, and may be located in a 3GPP network, so that the V2X configuration parameter can be managed by using a control plane and is no longer managed by using an application layer. This improves security of information about the V2X configuration parameter.

With reference to the second aspect, in a first possible design of the second aspect, the parameter request message includes V2X indication information, and V2X feature information of the terminal; V2X indication information; V2X authorized indication information; V2X feature information of the terminal; or V2X authorized indication information, and V2X feature information of the terminal. The V2X indication information may be used to indicate the V2X parameter configuration network element to return the V2X configuration parameter to the mobility management network element, and the V2X authorized indication information may be used to indicate that the terminal is authorized to use the V2X service and/or the terminal supports the V2X service.

With reference to the second aspect or the first possible design of the second aspect, in a second possible design of the second aspect, the V2X parameter configuration network element may prestore, for example, a correspondence between the V2X feature information and the V2X configuration parameter, a correspondence between location information and the V2X configuration parameter, and/or correspondences among the location information, the V2X feature information, and the V2X configuration parameter, so that the V2X parameter configuration network element may determine the V2X configuration parameter of the terminal based on the foregoing correspondences.

With reference to the second aspect, the first possible design of the second aspect, or the second possible design of the second aspect, in a third possible design of the second aspect, when the parameter request message includes the V2X feature information, the V2X parameter configuration network element determines, based on the prestored correspondence between the V2X feature information and the V2X configuration parameter, a V2X configuration parameter corresponding to the V2X feature information; when the parameter request message includes the V2X indication information or the V2X authorized indication information, the V2X parameter configuration network element determines the V2X configuration parameter of the terminal, for example, the V2X parameter configuration network element may determine all V2X configuration parameters of the terminal; or when the parameter request message includes the V2X indication information and the V2X feature information, or the parameter request message includes the V2X authorized indication information and the V2X feature information, the V2X parameter configuration network element determines, based on the prestored correspondence between the V2X feature information and the V2X configuration parameter, a V2X configuration parameter corresponding to the V2X feature information. Therefore, the V2X parameter configuration network element can determine the V2X configuration parameter of the terminal based on the parameter request message.

With reference to the second aspect, the first possible design of the second aspect, or the second possible design of the second aspect, in a fourth possible design of the second aspect, the V2X parameter configuration network element may further receive location information of the terminal that is from the mobility management network element; and determine, based on a prestored correspondence between the location information and the V2X configuration parameter, a V2X configuration parameter corresponding to the location information; or when the parameter request message includes the V2X feature information of the terminal, the V2X parameter configuration network element determines, based on prestored correspondences among the location information, the V2X feature information, and the V2X configuration parameter, a V2X configuration parameter corresponding to the location information and the V2X feature information.

With reference to the second aspect, the first possible design of the second aspect, or the second possible design of the second aspect, in a fifth possible design of the second aspect, the V2X parameter configuration network element may further receive authorized area information of the terminal and the location information of the terminal that are from the mobility management network element; and when a location corresponding to the location information is in an area corresponding to the authorized area information, the V2X parameter configuration network element determines the V2X configuration parameter of the terminal based on the parameter request message, for example, determines the V2X configuration parameter in the foregoing manner of determining the V2X configuration parameter.

With reference to the second aspect, the first possible design of the second aspect, or the second possible design of the second aspect, in a sixth possible design of the second aspect, the V2X parameter configuration network element may further obtain the V2X feature information and/or the authorized area information from, for example, the subscription information of the terminal, so that the V2X parameter configuration network element can determine the V2X configuration parameter in the foregoing manner of determining the V2X configuration parameter.

With reference to the second aspect, the first possible design of the second aspect, the second possible design of the second aspect, the third possible design of the second aspect, the fourth possible design of the second aspect, the fifth possible design of the second aspect, or the sixth possible design of the second aspect, in a seventh possible design of the second aspect, the V2X parameter configuration network element may further send the V2X feature information of the terminal to the mobility management network element, and send the V2X feature information to the terminal by using the mobility management network element. For example, when sending the V2X configuration parameter to the mobility management network element, the V2X parameter configuration network element may further send the V2X feature information corresponding to the determined V2X configuration parameter together with the V2X configuration parameter. This helps the terminal perform a V2X service based on the V2X feature information and the corresponding V2X configuration parameter.

According to a third aspect, a communication method is provided. The method includes: when a mobility management network element determines, based on location information of a terminal, that the terminal moves out of a preset area, sending, by the mobility management network element, a notification message to a V2X parameter configuration network element; receiving a V2X configuration parameter of the terminal from the V2X parameter configuration network element; and sending the V2X configuration parameter to the terminal. The notification message may be used to notify that the terminal moves out of the preset area. The V2X configuration parameter may be used by the terminal to perform a V2X service outside the preset area, for example, perform a V2X service such as V2X communication in an area that is outside the preset area and in which a location corresponding to the location information is located. The V2X parameter configuration network element may be a control plane network element, may be deployed by an operator, and may be located in a 3GPP network, so that the V2X configuration parameter can be managed by a control plane, thereby improving security of information about the V2X configuration parameter, helping reduce a communication delay, and meeting a requirement of V2X low-delay communication.

With reference to the third aspect, in a first possible design of the third aspect, the notification message may carry location information of the terminal, and the location information may be used by the V2X parameter configuration network element to determine the V2X configuration parameter of the terminal. This helps the V2X parameter configuration network element determine the V2X configuration parameter for the terminal based on the location information of the terminal.

With reference to the third aspect, or the first possible design of the third aspect, in a second possible design of the third aspect, the mobility management network element sends V2X feature information in subscription information of the terminal to the V2X parameter configuration network element, where the V2X feature information is used by the V2X parameter configuration network element to determine the V2X configuration parameter of the terminal. This helps the V2X parameter configuration network element determine the V2X configuration parameter for the terminal based on the V2X feature information of the terminal.

With reference to the third aspect, the first possible design of the third aspect, or the second possible design of the third aspect, in a third possible design of the third aspect, when the mobility management network element sends the V2X configuration parameter to the terminal, the mobility management network element may send the V2X configuration parameter to the terminal by using a target base station in an Xn handover process of the terminal from a source base station in the preset area to the target base station outside the preset area. Therefore, V2X parameter configuration of the terminal can be implemented in the handover process, thereby improving parameter obtaining efficiency.

With reference to the third aspect, the first possible design of the third aspect, or the second possible design of the third aspect, in a fourth possible design of the third aspect, when the mobility management network element sends the V2X configuration parameter to the terminal, the mobility management network element may send the V2X configuration parameter to the terminal by using a source base station in an N2 handover process of the terminal from the source base station in the preset area to a target base station outside the preset area. Therefore, V2X parameter configuration of the terminal can be implemented in the handover process, thereby improving parameter obtaining efficiency.

With reference to the third aspect, the first possible design of the third aspect, or the second possible design of the third aspect, in a fifth possible design of the third aspect, when the mobility management network element sends the V2X configuration parameter to the terminal, the mobility management network element may send the V2X configuration parameter to the terminal by using a target base station after the terminal is handed over from a source base station in the preset area to the target base station outside the preset area. Therefore, V2X parameter configuration of the terminal can be implemented after the handover is completed, thereby improving parameter obtaining reliability.

With reference to the third aspect, the first possible design of the third aspect, the second possible design of the third aspect, the third possible design of the third aspect, the fourth possible design of the third aspect, or the fifth possible design of the third aspect, in a sixth possible design of the third aspect, the mobility management network element receives a location information subscription request message from the V2X parameter configuration network element, where the location information subscription request message is used to request to send the notification message to the V2X parameter configuration network element when the terminal moves out of the preset area. The preset area may include an authorized area, for example, an area corresponding to authorized area information of the terminal, or may include an unauthorized area.

With reference to the third aspect, the first possible design of the third aspect, the second possible design of the third aspect, the third possible design of the third aspect, the fourth possible design of the third aspect, the fifth possible design of the third aspect, or the sixth possible design of the third aspect, in a seventh possible design of the third aspect, the mobility management network element sends the authorized area information in the subscription information of the terminal to the V2X parameter configuration network element. This helps the V2X parameter configuration network element subscribe to an event that the terminal moves out of an area, determine the V2X configuration parameter, and/or the like, based on the authorized area information.

With reference to the third aspect, the first possible design of the third aspect, the second possible design of the third aspect, the third possible design of the third aspect, the fourth possible design of the third aspect, the fifth possible design of the third aspect, the sixth possible design of the third aspect, or the seventh possible design of the third aspect, in an eighth possible design of the third aspect, the mobility management network element may further send the V2X feature information of the terminal to the terminal. For example, when sending the V2X configuration parameter to the terminal, the mobility management network element may further send the V2X feature information corresponding to the determined V2X configuration parameter to the terminal together with the V2X configuration parameter. This helps the terminal perform a V2X service based on the V2X feature information and the corresponding V2X configuration parameter. The V2X feature information may be obtained by the mobility management network element, for example, obtained from the subscription information of the terminal. Alternatively, the V2X feature information may be sent by the V2X parameter configuration network element to the mobility management network element. For example, when sending the V2X configuration parameter to the mobility management network element, the V2X parameter configuration network element also sends the V2X feature information to the mobility management network element together with the V2X configuration parameter.

According to a fourth aspect, a communication method is provided. The method includes: receiving, by a V2X parameter configuration network element, a notification message from a mobility management network element; and sending a V2X configuration parameter of a terminal to the mobility management network element based on the notification message. The notification message may be used to notify that the terminal moves out of the preset area. The V2X configuration parameter may be used by the terminal to perform a V2X service outside the preset area, for example, perform a V2X service such as V2X communication in an area that is outside the preset area and in which a location corresponding to location information is located. The V2X parameter configuration network element may be a control plane network element, may be deployed by an operator, and may be located in a 3GPP network, so that the V2X configuration parameter can be managed by a control plane, thereby improving security of information about the V2X configuration parameter, helping reduce a communication delay, and meeting a requirement of V2X low-delay communication.

With reference to the fourth aspect, in a first possible design of the fourth aspect, the V2X parameter configuration network element may prestore, for example, a correspondence between V2X feature information and the V2X configuration parameter, a correspondence between the location information and the V2X configuration parameter, and/or correspondences among the location information, the V2X feature information, and the V2X configuration parameter, so that the V2X parameter configuration network element may determine the V2X configuration parameter of the terminal based on the foregoing correspondences.

With reference to the fourth aspect or the first possible design of the fourth aspect, in a second possible design of the fourth aspect, the notification message may carry the location information of the terminal. Further, the V2X parameter configuration network element may determine, based on the prestored correspondence between the location information and the V2X configuration parameter, a V2X configuration parameter corresponding to the location information, for example, determine a V2X configuration parameter corresponding to an area in which a location corresponding to the location information is located.

With reference to the fourth aspect or the first possible design of the fourth aspect, in a third possible design of the fourth aspect, the V2X parameter configuration network element may further obtain the V2X feature information of the terminal, for example, obtain the V2X feature information from subscription information of the terminal, or receive the V2X feature information of the terminal that is from the mobility management network element. Further, the V2X parameter configuration network element may further determine, based on the prestored correspondence between the V2X feature information and the V2X configuration parameter, a V2X configuration parameter corresponding to the V2X feature information, or when the notification message carries the location information of the terminal, the V2X parameter configuration network element may further determine, based on the prestored correspondences among the location information, the V2X feature information, and the V2X configuration parameter, a V2X configuration parameter corresponding to the location information and the V2X feature information.

With reference to the fourth aspect, the first possible design of the fourth aspect, the second possible design of the fourth aspect, or the third possible design of the fourth aspect, in a fourth possible design of the fourth aspect, the V2X parameter configuration network element sends a location information subscription request message to the mobility management network element, and the location information subscription request message is used to request to send the notification message to the V2X parameter configuration network element when the terminal moves out of the preset area.

With reference to the fourth possible design of the fourth aspect, in a fifth possible design of the fourth aspect, the V2X parameter configuration network element may further obtain authorized area information of the terminal, for example, obtain the authorized area information from subscription information of the terminal; or the V2X parameter configuration network element may further receive the authorized area information of the terminal that is from the mobility management network element. Further, optionally, the V2X parameter configuration network element may generate the location information subscription request message based on the authorized area information. The preset area may include an authorized area, for example, an area corresponding to the authorized area information, or may include an unauthorized area.

With reference to the fourth aspect, the first possible design of the fourth aspect, the second possible design of the fourth aspect, the third possible design of the fourth aspect, the fourth possible design of the fourth aspect, or the fifth possible design of the fourth aspect, in a sixth possible design of the fourth aspect, the V2X parameter configuration network element may further send the V2X feature information of the terminal to the mobility management network element, and send the V2X feature information to the terminal by using the mobility management network element. For example, when sending the V2X configuration parameter to the mobility management network element, the V2X parameter configuration network element may further send the V2X feature information corresponding to the determined V2X configuration parameter together with the V2X configuration parameter. This helps the terminal perform the V2X service based on the V2X feature information and the corresponding V2X configuration parameter.

According to a fifth aspect, a communications apparatus is provided. The communications apparatus includes units or means configured to perform steps in the methods/method according to the first aspect and/or the third aspect. The communications apparatus may be a mobility management network element, or may be at least one processing element or chip.

According to a sixth aspect, a communications apparatus is provided. The communications apparatus includes a transceiver, a memory, and a processor. The processor is coupled to the memory and the transceiver. The memory is configured to store a program. The processor invokes the program stored in the memory, to perform the methods/method in the first aspect and/or the third aspect. The transceiver is configured to receive and/or send information. The communications apparatus may be a mobility management network element, or may be at least one processing element or chip.

According to a seventh aspect, a communications apparatus is provided. The communications apparatus includes units or means configured to perform steps in the methods/method according to the second aspect and/or the fourth aspect. The communications apparatus may be a V2X parameter configuration network element, or may be at least one processing element or chip.

According to an eighth aspect, a communications apparatus is provided. The communications apparatus includes a transceiver, a memory, and a processor. The processor is coupled to the memory and the transceiver. The memory is configured to store a program. The processor invokes the program stored in the memory, to perform the methods/method in the second aspect and/or the fourth aspect. The transceiver is configured to receive and/or send information. The communications apparatus may be a V2X parameter configuration network element, or may be at least one processing element or chip.

According to a ninth aspect, a communications system is provided. The system includes the mobility management network element and/or the V2X parameter configuration network element in the foregoing aspects.

In another possible design, the system further includes another device that interacts with the mobility management network element or the V2X parameter configuration network element in the solutions provided in the embodiments of the present invention.

According to a tenth aspect, a computer storage medium is provided. The computer storage medium is configured to store a computer software instruction used by the foregoing communications apparatus and the computer software instruction includes a program designed for executing the foregoing aspects.

According to an eleventh aspect, a computer program product including an instruction is provided. When the computer program product is run on a computer, the computer is enabled to perform the methods according to the foregoing aspects.

According to a twelfth aspect, a chip system is provided. The chip system includes a processor, used by a communications apparatus to implement functions in the foregoing aspects, for example, obtaining or processing data and/or information in the foregoing methods. In a possible design, the chip system further includes a memory, and the memory is configured to store a program instruction and data that are necessary for the communications apparatus. The chip system may include a chip, or may include a chip and another discrete component.

According to the solutions provided in the embodiments of the present invention, the V2X configuration parameter can be managed by the V2X parameter configuration network element, and sent to the terminal by using control plane signaling, so that the V2X configuration parameter can be managed by using the control plane and is no longer managed by using the application layer. This improves the security of the information about the V2X configuration parameter.

BRIEF DESCRIPTION OF DRAWINGS

To describe the technical solutions in the embodiments of the present invention or in the background more clearly, the following briefly describes the accompanying drawings used in the embodiments of the present invention or the background.

DESCRIPTION OF EMBODIMENTS

Technical solutions in this application may be applied to various communications systems, for example, global system for mobile communications (GSM for short), code division multiple access (CDMA for short), wideband code division multiple access (WCDMA for short), time division-synchronous code division multiple access (TD-SCDMA for short), universal mobile telecommunications system (UMTS for short), and long term evolution (LTE for short) networks. With continuous development of communications technologies, the technical solutions in this application may be further applied to a future network, for example, a 5G network, also referred to as a new radio (NR for short) network, or the technical solutions may be applied to a D2D (device to device) network, an M2M (machine to machine) network, or the like.

Figure 1:
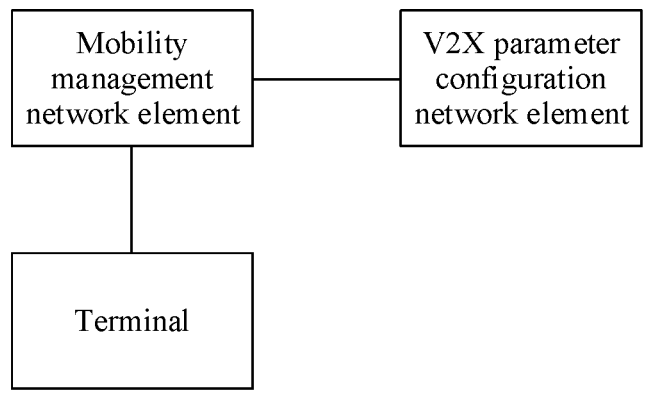
FIG. 1 is a schematic diagram of a communications system.

FIG. 1 is a schematic diagram of a communications system according to this application. As shown in FIG. 1, the communications system includes a terminal, a mobility management network element, and a V2X parameter configuration network element. The terminal, the mobility management network element, and the V2X parameter configuration network element may communicate by using the foregoing communications systems, for example, the LTE system or the 5G system. The V2X parameter configuration network element may be a control plane network element, may be deployed by an operator, and may be located in a 3 GPP network.

The terminal is a device having a communication function, and may be, for example, a handheld device having a wireless communication function, a vehicle-mounted device, a wearable device, a computing device, or another processing device connected to a wireless modem. The terminal may have different names in different networks, for example, a terminal, user equipment (UE for short), a mobile station, a subscriber unit, a station, a cellular phone, a personal digital assistant, a wireless modem, a wireless communications device, a handheld device, a laptop computer, a cordless phone, and a wireless local loop station. The terminal may be a wireless terminal or a wired terminal. The wireless terminal may be a device that provides a user with voice and/or data connectivity, a handheld device with a wireless connection function, or another processing device connected to a wireless modem. The wireless terminal may communicate with one or more core networks over, for example, a radio access network (RAN for short).

The mobility management network element may be a network element that requests a V2X configuration parameter for the terminal, and may be, for example, an access and mobility management function (AMF for short) entity or a mobility management entity (MME for short). The V2X parameter configuration network element may be a network element that allocates a V2X configuration parameter to the terminal, and may be, for example, a policy and charging function (PCF for short) entity, a policy and charging rules function (PCRF for short) entity, or a V2X control function. Other network elements can be used also. When the V2X parameter configuration network element is the V2X control function, a control plane interface of the V2X control function may be opened to connect to the mobility management network element such as the AMF, and an application layer is no longer used to configure the V2X configuration parameter for the terminal, thereby improving security of a V2X service.

If the terminal uses a V2X (including an eV2X, namely, an evolved V2X) service, the terminal may obtain a corresponding V2X configuration parameter. Specifically, the terminal may request the V2X configuration parameter from the V2X parameter configuration network element by using the mobility management network element, and the V2X configuration parameter may be sent to the terminal by using the mobility management network element. For example, after the V2X configuration parameter is determined based on a V2X feature parameter of the terminal, the V2X configuration parameter is sent to the terminal by using the mobility management network element, so that the terminal can perform the V2X service based on the requested V2X configuration parameter, for example, communicate with another terminal or a network side.

V2X feature information may also be referred to as a V2X authorized feature, an authorized V2X feature such as a V2X authorized feature, or a V2X feature such as a V2X feature or a V2X feature parameter, or may be referred to as another name. This is not limited in this application. The V2X feature information may include V2X feature information of a PC5 interface and V2X feature information of a Uu interface. The V2X feature information of the PC5 interface may include: V2X communication served by a E-UTRAN (V2X communication "served by E-UTRAN") or V2X communication not served by a E-UTRAN (V2X communication "not served by E-UTRAN"); terminal-to-terminal relay communication (UE-to-UE Relay); terminal-to-network relay communication (UE-to-Network Relay); V2X discovery over the PC5 interface (V2X discovery over PC5); V2X group communication; V2X platooning communication; automatic driving; and the like. The V2X feature information of the Uu interface may include V2X communication via a multimedia broadcast multicast system (MBMS for short) (V2X communication via MBMS), V2X unicast communication via the Uu interface (V2X unicast via Uu), remote driving, and the like.

The V2X configuration parameter may also be referred to as a V2X authorized parameter, V2X authorized information, authorized information, a V2X parameter, V2X information, V2X policy information, policy information, a V2X policy parameter, a policy parameter, or V2X configuration information, or may be referred to by another name. This is not limited in this application. The V2X configuration parameter may include, for example, a parameter used for V2X communication (service transmission) via the PC5 interface, and/or a parameter used for V2X communication via the Uu interface. The parameter used for V2X communication via the PC5 interface may include an air interface parameter used when the terminal is "not served by E-UTRAN", for example, an air interface parameter (for example, a frequency band) associated with a geographical area (Geographical Area), and identification information, where the identification information is used to identify whether these parameters are operator managed or non-operator managed (when the terminal is "not served by E-UTRAN" and the terminal is in these geographic areas, the terminal may perform V2X communication via the PC5 interface by using these air interface parameters); mapping between a target layer-2 identifier (target layer-2 ID) and a V2X service (for example, a provider service identifier (provider service identifier, PSID for short) or an intelligent transportation system-application identifier (Intelligent Transport Systems-application identifier, ITS-AIDs for short) of a V2X application); mapping between a proSe per-packet priority (PPPP for short) and a packet delay budget (PDB for short) that are used for V2X communication; a list of V2X services associated with a geographical area (such as a PSID or an ITS-AID of a V2X application); mapping between a service type (such as a PSID or an ITS-AID) and a V2X frequency that are associated with the geographical area; discovery code used for V2X discovery; and the like.

The parameter used for V2X communication via the Uu interface such as an LTE-Uu interface or a next generation (NG for short) Uu interface, namely, an NG-Uu interface, may include: a public land mobile network (PLMN for short) in which the terminal is authorized to use V2X communication via MBMS, for example, a V2X user service description (USD for short) related to V2X data received in an MBMS manner in the PLMN, where the V2X USD may be obtained from a V2X application server; address information of the V2X application server, for example, a fully qualified domain name (FQDN for short) list or IP address information of the V2X application server, where the fully qualified domain name list or the IP address information of the V2X application server may be associated with geographical area information and a PLMN list in which the V2X application server provides a service; a mapping relationship between the PLMN list and a USD of the V2X application server, where the V2X Server USD is used to receive information from the V2X application server by using an MBMS; a mapping relationship between a V2X service (for example, a PSID or an ITS-AID of a V2X application) and an address of a V2X application server used for unicast (for example, the address includes an IP address/ an FQDN, and a user datagram protocol (UDP for short) port number); and a mapping relationship between a V2X service (for example, a PSID or an ITS-AID of a V2X application) and a V2X USD of an MBMS, or the like.

Figure 2:
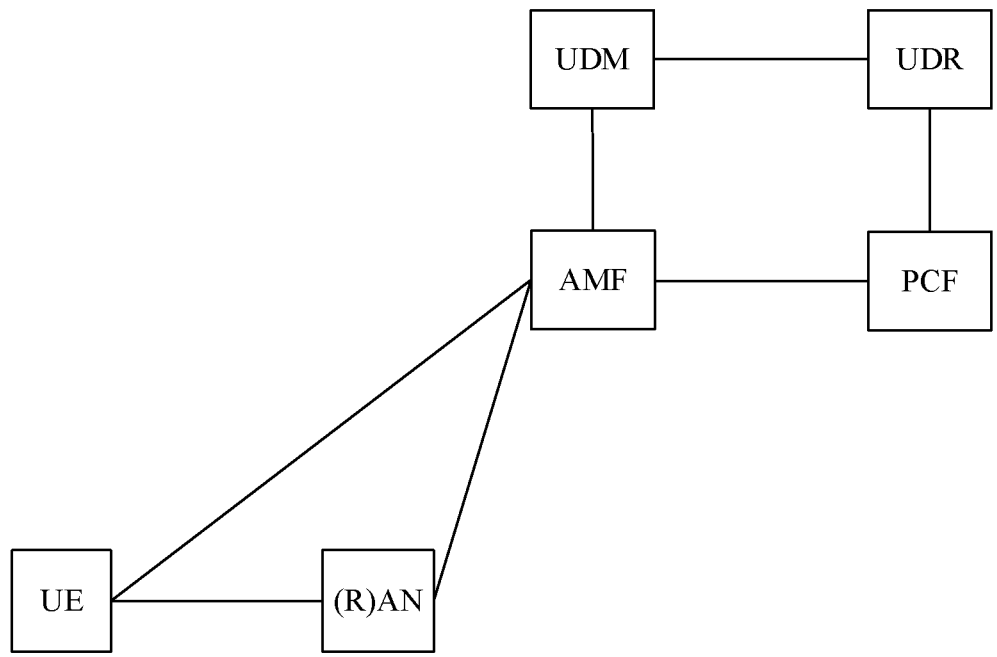
FIG. 2 is a schematic diagram of another communications system.

Further, for example, the terminal is UE, the mobility management network element is an AMF, and the V2X parameter configuration network element is a PCF. FIG. 2 is a schematic diagram of another communications system. As shown in FIG. 2, the UE may communicate with the AMF over an access network such as a radio access network (RAN for short), namely, a network in which a base station connected to the UE is located, and the AMF may communicate with the PCF. Further, the communications system may further include network elements such as a session management function (SMF for short) entity, a user plane function (UPF for short) entity, unified data management (UDM for short), and a unified data repository (UDR for short). The access network such as the RAN may be a network including a plurality of 5G-RAN nodes such as base stations, and is used to implement a radio physical layer function, resource scheduling and radio resource management, radio access control, and a mobility management function. Further, the RAN may be connected to the UPF, for example, connected to the UPF via a user plane interface N3, to transmit data of the UE. The RAN may be further connected to the AMF. For example, the RAN establishes a control plane signaling connection to the AMF via a control plane interface N2, to implement a function such as radio access bearer control. For example, the AMF may be responsible for functions such as UE authentication, UE mobility management, network slice selection, and SMF selection. The PCF may configure a V2X parameter for the UE. The UDR may store information such as subscription data of the UE, and the UDM may obtain subscription information of the UE from the UDR.

The embodiments of this application may be based on the system architecture shown in FIG. 1 or FIG. 2. No limitation is imposed. Another optional embodiment may be alternatively based on any other system architecture, for example, an LTE system architecture.

This application discloses a communication method and a communications apparatus, to help improve security of a V2X service. The following provides separate descriptions by using an example in which the terminal is the UE, the mobility management network element is the AMF, and the V2X parameter configuration network element is the PCF.

Figure 3:
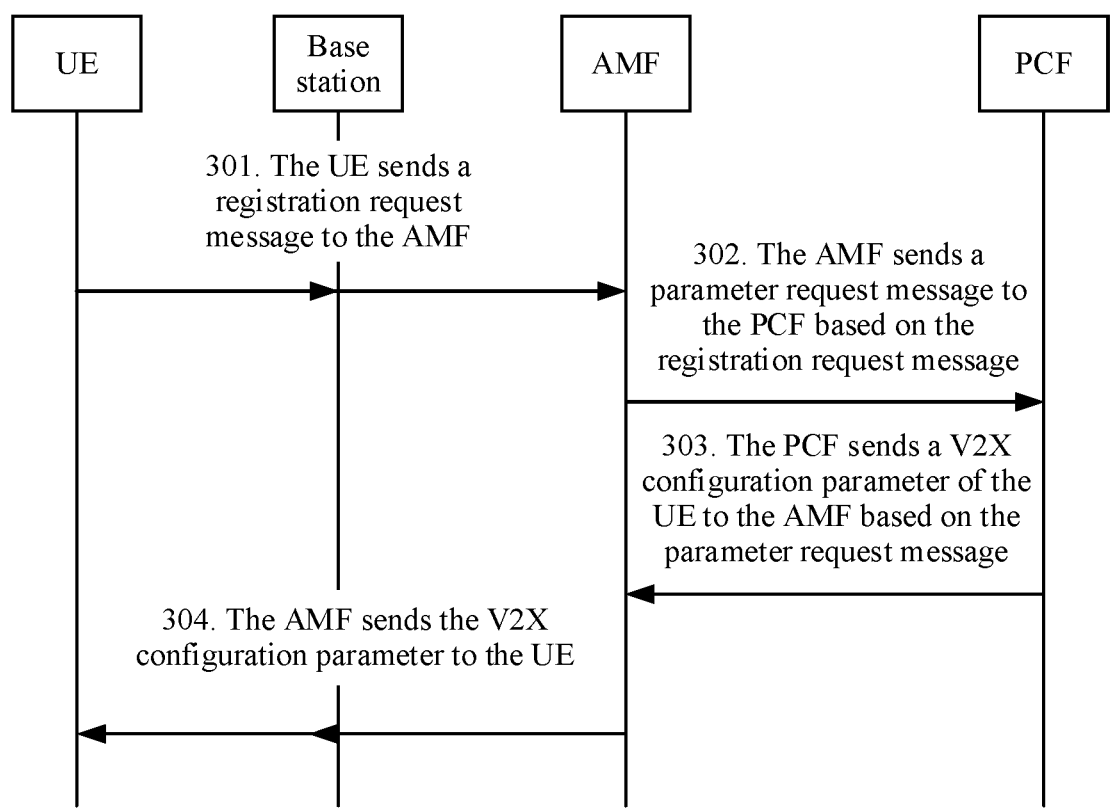
FIG. 3 is a schematic interaction diagram of a communication method according to an embodiment of the present invention.

FIG. 3 is a schematic interaction diagram of a communication method according to an embodiment of the present invention. As shown in FIG. 3, the communication method provided in this embodiment of the present invention may be based on the system architecture shown in FIG. 2, and the method may include the following steps.

301: UE sends a registration request message to an AMF.

The registration request message may be used to request a V2X configuration parameter for the UE, and the V2X configuration parameter may be used by the UE to perform a V2X service, for example, perform V2X communication.

Optionally, the registration request message may carry capability indication information, and the capability indication information may be used to indicate that the UE supports a V2X service or indicate that the UE supports V2X communication over PC5 (V2X communication over PC5 supported). For example, the capability indication information may be referred to as a V2X indication, V2X communication over PC5 supported, or another name. This is not limited in this application.

302: The AMF sends a parameter request message to a PCF based on the registration request message.

The parameter request message may be used to request the V2X configuration parameter of the UE from the PCF. Specifically, the AMF may receive the registration request message from the UE, and then send the parameter request message such as an Npcf_AMPolicyControl_Get (UE access and mobility policy control obtaining provided by the PCF network element) request message to the PCF, to request the V2X configuration parameter of the UE.

Optionally, the parameter request message may include but is not limited to: V2X indication information and V2X feature information of the UE; V2X indication information; V2X authorized indication information; V2X feature information of the UE; or V2X authorized indication information and V2X feature information of the UE. The V2X indication information may be used to indicate the PCF to return the V2X configuration parameter to the AMF, and the V2X authorized indication information may be used to indicate that the UE is authorized to use the V2X service and/or the UE supports the V2X service.

For example, if the parameter request message may include the V2X feature information, the AMF may send the V2X feature information in subscription information of the UE to the PCF, to request the V2X configuration parameter of the UE from the PCF. Further, optionally, the subscription information may be stored in a UDR. The AMF may obtain the subscription information of the UE from UDM (where the UDM obtains the subscription information of the UE from the UDR), and then obtain the V2X feature information of the UE from the subscription information.

Further, optionally, when the UE is authorized to use the V2X service, and the registration request message carries capability indication information used to indicate that the UE supports the V2X service, the AMF sends the parameter request message to the PCF, that is, performs step 302; or when the UE is authorized to use the V2X service, the AMF sends the parameter request message to the PCF. In other words, the AMF may send the parameter request message to the PCF when determining that the UE that reports the registration request message is authorized to use the V2X service, that is, a user corresponding to a user identifier (for example, a UE's subscription permanent identifier (SUPI for short) or an international mobile subscriber identity (IMSI for short) of the UE is authorized to use the V2X service. Alternatively, the AMF may send the parameter request message to the PCF when determining that a user corresponding to a user identifier of the UE is authorized to use the V2X service, and the UE supports the V2X service, that is, both the UE and a user on the UE can use the V2X service. Optionally, the AMF may determine, based on the subscription information of the UE, whether the UE is authorized to use the V2X service. For example, the subscription information may be stored in the UDR, and the AMF may obtain the subscription information of the UE from the UDM (where the UDM obtains the subscription information of the UE from the UDR) and then determine, in the subscription information, whether the UE is authorized to use the V2X service.

303: The PCF sends the V2X configuration parameter of the UE to the AMF based on the parameter request message.

Specifically, the PCF may receive the parameter request message from the AMF, determine the V2X configuration parameter for the UE based on the parameter request message, and return the V2X configuration parameter to the AMF. For example, the V2X configuration parameter may be carried in an Npcf_AMPolicyControl_Get response message and returned to the AMF. The V2X configuration parameter may be used by the UE to perform the V2X service.

Optionally, the PCF may prestore a correspondence between the V2X feature information and the V2X configuration parameter, a correspondence between location information and the V2X configuration parameter, correspondences among the location information, the V2X feature information, and the V2X configuration parameter, and/or the like, so that the PCF may determine the V2X configuration parameter of the UE based on the foregoing correspondences.

304: The AMF sends the V2X configuration parameter to the UE.

Optionally, when the PCF determines the V2X configuration parameter of the UE, and when the parameter request message includes the V2X feature information, the PCF may determine, based on the prestored correspondence between the V2X feature information and the V2X configuration parameter, a V2X configuration parameter corresponding to the V2X feature information; when the parameter request message includes the V2X indication information or the V2X authorized indication information, the PCF may determine the V2X configuration parameter of the UE, for example, the PCF may determine all V2X configuration parameters of the UE; or when the parameter request message includes the V2X indication information and the V2X feature information, or the parameter request message includes the V2X authorized indication information and the V2X feature information, the PCF may determine, based on the prestored correspondence between the V2X feature information and the V2X configuration parameter, a V2X configuration parameter corresponding to the V2X feature information. Further, optionally, if the parameter request message does not carry the V2X feature information, for example, when the parameter request message includes the V2X indication information or the V2X authorized indication information, the PCF may alternatively obtain the V2X feature information of the UE from the subscription information of the UE (for example, the PCF may obtain the subscription information of the UE from the UDR), and then the PCF may determine, based on the prestored correspondence between V2X feature information and the V2X configuration parameter, a V2X configuration parameter corresponding to the V2X feature information.

Further, optionally, the AMF may further send the location information of the UE to the PCF, where the location information may be used by the PCF to determine the V2X configuration parameter of the UE. Optionally, the location information may be reported by a RAN, for example, a base station, to the AMF. Further, the PCF may receive the location information of the UE that is from the AMF. Then, the PCF may determine, based on the prestored correspondence between the location information and the V2X configuration parameter, a V2X configuration parameter corresponding to the location information. Alternatively, when the parameter request message includes the V2X feature information of the UE, the PCF may further determine, based on the prestored correspondences among the location information, the V2X feature information, and the V2X configuration parameter, a V2X configuration parameter corresponding to the location information and the V2X feature information.

Further, optionally, the AMF may further send, to the PCF, the authorized area information (or referred to as V2X authorized area information) in the subscription information of the UE, where the V2X authorized area information may be used by the PCF to determine the V2X configuration parameter of the UE, and the V2X authorized area information may include information about an authorized area (or referred to as a V2X authorized area), such as an interest area or an authorized area, of the UE. The AMF may obtain the V2X authorized area information of the V2X service of the UE from the subscription information of the UE, and send the V2X authorized area information to the PCF. Further, the PCF may receive the V2X authorized area information of the UE and the location information of the UE that are from the AMF. Alternatively, the PCF may receive the location information of the UE, and may obtain the V2X authorized area information of the UE from the subscription information of the UE (for example, obtain the subscription information from the UDR). When a location corresponding to the location information is in an area corresponding to the V2X authorized area information, the PCF may determine the V2X configuration parameter of the UE based on the parameter request message. For a specific manner of determining the V2X configuration parameter by the PCF, refer to the foregoing descriptions. Details are not described herein again. Optionally, if a location corresponding to the location information of the UE is in an area corresponding to the V2X authorized area information, the PCF may send, to the UE, a V2X configuration parameter of the location (namely, a part of the V2X authorized area) at which the UE is located. Alternatively, if the location corresponding to the location information of the UE is in the area corresponding to the V2X authorized area information, the PCF may send, to the UE, all V2X configuration parameters corresponding to the entire V2X authorized area.

Further, after determining the V2X configuration parameter of the UE, the PCF may send the V2X configuration parameter to the AMF. The AMF may receive the V2X configuration parameter from the PCF, and may send the V2X configuration parameter to the UE, for example, send the V2X configuration parameter to the UE by using a RAN such as a base station. Optionally, the AMF may send the V2X configuration parameter to the UE by using a registration accept message such as a registration accept message.

For example, if the V2X feature information of the UE that is obtained by the PCF (for example, the received V2X feature information sent by the AMF or the V2X feature information obtained from the UDR) includes V2X discovery, the V2X configuration parameter determined by the PCF may include a V2X discovery code, and the V2X discovery code is used by the UE to discover another V2X UE (namely, UE that supports the V2X service and that is authorized to use the V2X service). Therefore, the UE can discover another V2X UE based on the V2X discovery code, and then perform V2X communication with the V2X UE.

As another example, if the PCF obtains the location information of the UE (for example, receives the location information of the UE that is sent by the AMF), the V2X configuration parameter determined by the PCF may include a mapping relationship between a target layer-2 ID and the V2X service (for example, a PSID or an ITS-AID of a V2X application). When the UE sends a message corresponding to the V2X application (the PSID or the ITS-AID), the UE may include a corresponding layer-2 ID in the message.

As another example, when the V2X feature information of the UE that is obtained by the PCF includes "not served by E-UTRAN", the V2X configuration parameter determined by the PCF may include an air interface parameter when the UE is "not served by E-UTRAN", for example, an air interface parameter (for example, a frequency band) associated with a geographical area (Geographical Area). In this case, when a V2X communication mode: "not served by E-UTRAN" is enabled, the UE may perform V2X communication by using the air interface parameter associated with the geographical area (Geographical Area).

As another example, when the V2X feature information of the UE that is obtained by the PCF includes "the UE is authorized to use V2X communication via MBMS", the V2X configuration parameter determined by the PCF may include a PLMN in which the UE is authorized to use the V2X communication via the MBMS, for example, a V2X USD related to V2X data received in an MBMS manner in the PLMN. Therefore, the UE may receive, in the MBMS manner, the V2X service on an MBMS resource described by the USD.

As another example, when the V2X feature information of the UE that is obtained by the PCF includes V2X feature information of the Uu interface, the V2X configuration parameter determined by the PCF may include address information of the V2X application server, for example, an FQDN list of the V2X application server or IP address information of the V2X application server, and the FQDN list of the V2X application server or the IP address information of the V2X application server may be associated with geographical area information and a PLMN list in which the V2X application server provides a service. Therefore, the UE may select an appropriate V2X application server based on the V2X configuration parameter, and perform the V2X service.

As another example, when the V2X feature information of the UE that is obtained by the PCF includes "not served by E-UTRAN", and the location information of the UE is obtained, the V2X configuration parameter determined by the PCF may include an air interface parameter when the UE is "not served by E-UTRAN", to be specific, an air interface parameter (for example, a frequency band) associated with a location area corresponding to the location information of the UE. In this case, when a V2X communication mode: "not served by E-UTRAN" is enabled, the UE may perform V2X communication by using the air interface parameter associated with the geographical area (Geographical Area) in the location area corresponding to the location information of the UE.

Further, optionally, when sending the V2X configuration parameter to the UE, the AMF may further send the V2X feature information corresponding to the V2X configuration parameter to the UE together with the V2X configuration parameter, so that the UE performs the V2X service based on the V2X feature information and the corresponding V2X configuration parameter. For example, the PCF may send, to the AMF, the V2X configuration parameter and the V2X feature information corresponding to the determined V2X configuration parameter, and then the AMF sends, to the UE, the V2X configuration parameter and the V2X feature information corresponding to the determined V2X configuration parameter. Alternatively, the PCF may send the V2X configuration parameter to the AMF, and after receiving the V2X configuration parameter sent by the PCF, the AMF may determine the V2X feature information corresponding to the determined V2X configuration parameter, and send, to the UE, the V2X configuration parameter, the V2X feature information corresponding to the V2X configuration parameter, and the like. This is not limited in this application.

Further, optionally, if the PCF determines that the V2X configuration parameter of the UE is updated (where the update includes that a new V2X configuration parameter exists or an originally configured V2X configuration parameter becomes invalid), for example, the PCF receives an update parameter that corresponds to a V2X cooperation parameter and that is from the V2X application server, or the PCF learns, by using the AMF from the UDM, that the V2X configuration parameter is updated, or learns, from the UDR, that the V2X configuration parameter is updated, the PCF may determine that the V2X configuration parameter is updated. Then, the PCF may send the updated V2X configuration parameter to the UE by using the AMF, or notify, by using the AMF, the UE that the V2X configuration parameter of the UE is updated. Therefore, the UE can obtain the updated V2X configuration parameter. Optionally, after the UE obtains the updated V2X configuration parameter, the UE may delete the original V2X configuration parameter, or may still retain the original V2X configuration parameter (for example, the UE moves out of an area corresponding to the original V2X configuration parameter, and retains the V2X configuration parameter for subsequent use); or if the AMF notifies the UE that the originally obtained V2X configuration parameter is invalid, the UE may delete the V2X configuration parameter.

Figure 4:
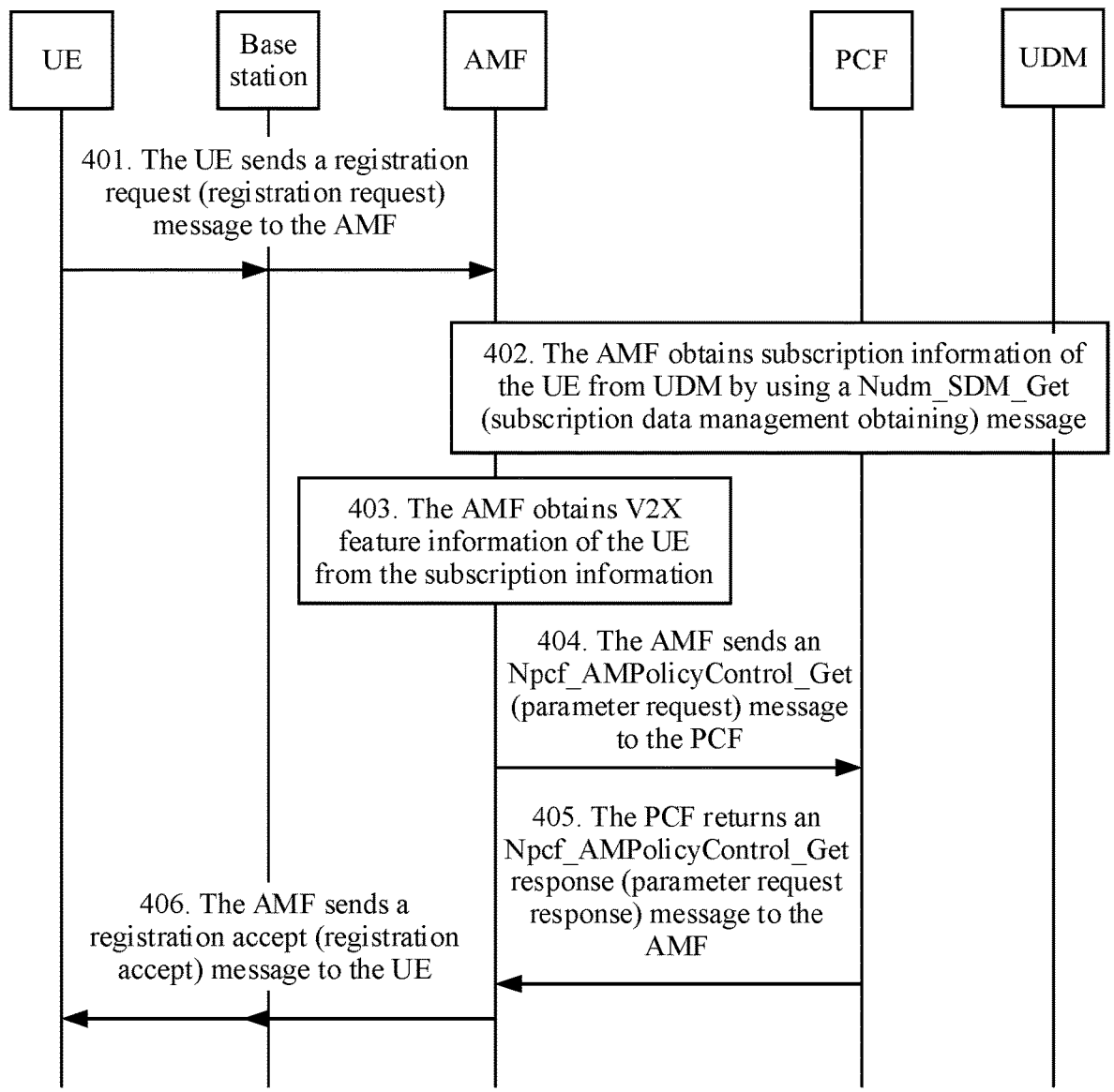
FIG. 4 is a schematic interaction diagram of another communication method according to an embodiment of the present invention.

FIG. 4 is a schematic interaction diagram of another communication method according to an embodiment of the present invention. As shown in FIG. 4, the communication method provided in this embodiment of the present invention may be based on the system architecture shown in FIG. 2, and the method may include the following steps.

401: UE sends a registration request message to an AMF.

The UE may send the registration request message such as a registration request message to the AMF by using a base station (RAN), to request a V2X configuration parameter. Optionally, the registration request message may carry capability indication information such as a V2X indication, to indicate that the UE supports a V2X service.

402: The AMF obtains subscription information of the UE from UDM by using a Nudm_SDM_Get message.

After receiving the registration request message sent by the UE, the AMF may obtain the subscription information of the UE, for example, V2X subscription. For example, the AMF sends, to the UDM, a subscription data management obtaining (service) (Nudm_SDM_Get) message provided by the UDM, to request the subscription information of the UE, and the UDM returns the subscription information to the AMF. The subscription information of the UE may be obtained by the UDM from a UDR.

403: The AMF obtains V2X feature information of the UE from the subscription information.

404: The AMF sends an Npcf_AMPolicyControl_Get message to a PCF, where the Npcf_AMPolicyControl_Get message carries the V2X feature information of the UE. Optionally, the Npcf_AMPolicyControl_Get message may further carry location information of the UE, V2X indication information, V2X authorized indication information, authorized area information of the UE, and/or the like.

After obtaining the subscription information of the UE, the AMF may perform a V2X authorization check on the subscription information, to obtain the V2X feature information of the UE, for example, V2X features. The AMF requests the V2X configuration parameter, for example, a V2X parameter (V2X authorization check, for the authorized V2X features, AMF retrieves V2X parameters from PCF) from the PCF. For example, the AMF sends a parameter request message such as the Npcf_AMPolicyControl_Get message to the PCF. Then, after receiving the Npcf_AMPolicyControl_Get message, the PCF may determine a V2X configuration parameter corresponding to the V2X feature information. Optionally, if the Npcf_AMPolicyControl_Get message further carries the location information of the UE, the V2X indication information, the V2X authorized indication information, and/or the authorized area information of the UE, the PCF may alternatively determine the V2X configuration parameter based on the location information of the UE, the V2X indication information, the V2X authorized indication information, and/or the authorized area information of the UE. For a determining manner, refer to the related descriptions of the embodiment shown in FIG. 3. Details are not described herein again.

405: The PCF returns an Npcf_AMPolicyControl_Get response message to the AMF, where the Npcf_AMPolicyControl_Get response message carries the V2X configuration parameter of the UE.

After determining, for the UE, the V2X configuration parameter corresponding to the V2X feature information, the PCF may return, to the AMF, an Npcf_AMPolicyControl_Get response message carrying the V2X configuration parameter.

406: The AMF sends a registration accept message to the UE, where the registration accept message carries the V2X configuration parameter.

After receiving the V2X configuration parameter returned by the PCF, the AMF may send the V2X configuration parameter to the UE by using the registration accept message.

Optionally, the AMF may further send the V2X feature information to the UE, and/or the PCF may update the V2X configuration parameter of the UE by using the AMF. For details, refer to the related descriptions of the embodiment shown in FIG. 3. Details are not described herein again.

In this embodiment of the present invention, information about the V2X configuration parameter can be controlled by the PCF, and sent to the UE by using control plane signaling, so that the V2X configuration parameter can be managed by using a control plane, for example, the V2X configuration parameter of the UE can be managed by an operator by using a control plane, and is no longer managed by using an application layer. This improves security of the information about the V2X configuration parameter.

Figure 5:
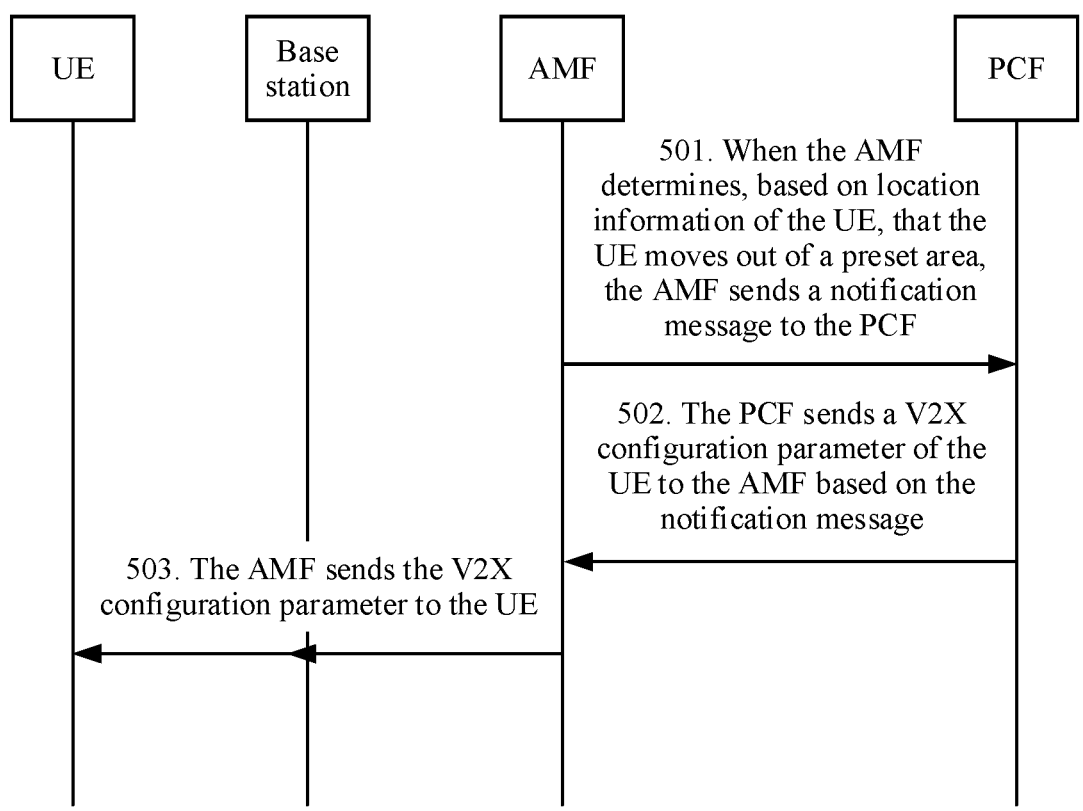
FIG. 5 is a schematic interaction diagram of still another communication method according to an embodiment of the present invention.

With reference to FIG. 2, refer to FIG. 5. FIG. 5 is a schematic interaction diagram of still another communication method according to an embodiment of the present invention. Specifically, as shown in FIG. 5, the communication method in this embodiment of the present invention may include the following steps.

501: When an AMF determines, based on location information of UE, that the UE moves out of a preset area, the AMF sends a notification message to a PCF.

The notification message may be used to notify that the UE moves out of the preset area.

Optionally, the PCF sends a location information subscription request message to the AMF. The location information subscription request message may be used to request to send the notification message to the PCF when the UE moves out of the preset area. For example, the location information subscription request message may be an event exposure subscribe message (Namf_EventExposure subscribe) provided by the AMF. The PCF may determine an area in which the notification message needs to be subscribed to, namely, the preset area, and then generate the location information subscription request message that is used to request to send the notification message to the PCF when the UE moves out of the preset area, where the location information subscription request message may carry information about the preset area. The preset area may be determined based on a location area corresponding to V2X configuration information currently obtained by the UE. For example, when a current location area of the UE is a PLMN 1, the preset area is the PLMN 1. Alternatively, the preset area may be determined based on V2X authorized area information of the UE, or may be determined in another manner. This is not limited in this application.

For example, the preset area or the location information subscription request message may be determined based on authorized area information of the UE. For example, the AMF may obtain the authorized area information of the UE from subscription information of the UE that is stored in UDM, and send the authorized area information to the PCF. Further, the PCF may receive the authorized area information of the UE that is from the AMF, and may generate the location information subscription request message based on the authorized area information. Alternatively, the PCF may obtain the subscription information of the UE, for example, obtain the subscription information of the UE from a UDR, to obtain the authorized area information of the UE. Alternatively, the PCF may determine, based on a V2X configuration parameter currently used by the UE, authorized area information corresponding to the V2X configuration parameter, and then generate the location information subscription request message based on the authorized area information. Further, optionally, the preset area may include an authorized area corresponding to the authorized area information, or may include an unauthorized area. The PCF may perform subscription based on a requirement. For example, the preset area may be an entire V2X authorized area or a part of a V2X authorized area corresponding to the V2X authorized area information of the UE. For example, when the V2X authorized area is a PLMN 1, a PLMN 2, and a PLMN 3, the preset area may be the PLMN 1. Alternatively, the preset area may be determined with reference to a location area corresponding to a V2X configuration parameter currently obtained by the UE and a V2X authorized area of the UE.

For example, when a location area corresponding to the V2X configuration parameter currently obtained by the UE is the PLMN 1 and the V2X authorized area is the PLMN 1, the PLMN 2, and the PLMN 3, the preset area may be any PLMN other than the PLMN 2, the PLMN 3, (the PLMN 2 and the PLMN 3), or (the PLMN 1, the PLMN 2, and the PLMN 3).

The AMF receives the location information subscription request message from the PCF, and then determines the information about the preset area. Optionally, the AMF may monitor the location information of the UE, and compare the location information of the UE with location information of the preset area. If the UE moves out of the preset area, for example, when the UE is handed over from a source base station in the preset area to a target base station outside the preset area, the AMF may send a notification message to the PCF, to notify the PCF that the UE moves out of the preset area. The location information of the UE may be reported by a RAN, for example, a base station, to the AMF.

Optionally, if the preset area may be one or more V2X authorized areas, a scenario in which the UE moves includes a scenario in which the UE moves out of a V2X authorized area to an unauthorized area and a scenario in which the UE moves out of a V2X authorized area to an authorized area. Alternatively, if the preset area may be one or more unauthorized areas, a scenario in which the UE moves includes a scenario in which the UE moves out of an unauthorized area to a V2X authorized area and a scenario in which the UE moves out of an unauthorized area to an unauthorized area. Alternatively, the preset area may include one or more V2X authorized areas and one or more unauthorized areas. Further, optionally, the AMF may send the notification message to the PCF after determining that the UE moves out of the preset area to a V2X authorized area (for example, information about the V2X authorized area may be obtained based on the subscription information of the UE, and the V2X authorized area is determined). If the UE moves out of the preset area to the unauthorized area, the AMF may not send the notification message to the PCF, or the AMF may send, to the PCF, the notification message that is used to indicate that the UE moves out to the unauthorized area, so that in a scenario in which the UE moves out of the preset area to the unauthorized area, the PCF does not need to trigger a V2X configuration parameter obtaining procedure. This reduces PCF power consumption and system overheads. The unauthorized area may be an area other than the V2X authorized area.

Further, optionally, the location information subscription request message may be sent to the AMF after the PCF allocates, to the UE, V2X configuration information corresponding to the current location area of the UE. Alternatively, the location information subscription request message may be sent by the PCF to the AMF in real time after obtaining the location information of the UE, to subscribe to an event of moving out of an area corresponding to the location information. That is, the location information subscription request message may be used to request to send a notification message to the PCF when the UE moves out of the area corresponding to the location information, where the area corresponding to the location information is the preset area. Alternatively, the location information subscription request message may be sent by the PCF to the AMF in advance. In other words, the PCF may notify the AMF in advance of specific move-out events to be reported, and the like. This is not limited in this application.

502: The PCF sends the V2X configuration parameter of the UE to the AMF based on the notification message.

The V2X configuration parameter may be used by the UE to perform a V2X service such as V2X communication outside the preset area.

Specifically, the PCF may receive the notification message from the AMF, and then may determine, based on the notification message, that the UE moves out of the preset area. Further, after determining that the UE moves out of the preset area, the PCF may determine the V2X configuration parameter of the UE. For example, the PCF determines a V2X configuration parameter corresponding to an area outside the preset area. In this case, the PCF sends the V2X configuration parameter corresponding to the area outside the preset area to the UE by using the AMF, and the UE performs a V2X service such as V2X communication based on the V2X configuration parameter.

Optionally, the notification message may carry the location information of the UE, and the location information may be used by the PCF to determine the V2X configuration parameter of the UE. Further, the PCF may determine, based on a prestored correspondence between location information and a V2X configuration parameter, the V2X configuration parameter corresponding to the location information. The location information may be reported by the base station to the AMF. Optionally, it is assumed that the UE is handed over from a source base station in the preset area to a target base station outside the preset area. If the handover is an Xn handover, the notification message may be sent to the AMF by using the target base station. For example, the notification message may be a path switch request (path switch request) message, or the location information of the UE may be carried in the path switch request, and the location information of the UE may include a target base station identifier or a target cell identifier. In other words, the target base station identifier or the target cell identifier carried in the path switch request is the location information of the UE. If the handover is an N2 handover, the notification message may be sent to the AMF by using the target base station. For example, the notification message may be a handover request acknowledge message, or in other words, the location information of the UE may be carried in the handover request acknowledge message, and a target base station identifier or a target cell identifier carried in the handover request acknowledge message is the location information of the UE. Optionally, if the handover is an N2 handover, the notification message may be sent to the AMF by using the source base station. For example, the notification message may be a handover required message, or in other words, the location information of the UE may be carried in the handover required message, and a target base station identifier or a target cell identifier carried in the handover required message is the location information of the UE. Optionally, if the handover is an N2 handover, the notification message may be sent to the AMF by using the target base station. For example, the notification message may be handover notified, or in other words, the location information of the UE may be carried in the handover notified, and a target base station identifier or a target cell identifier carried in the handover notified is the location information of the UE.

Optionally, the AMF may further send V2X feature information in the subscription information of the UE to the PCF, and the PCF may receive the V2X feature information of the UE from the AMF. Alternatively, the PCF may further obtain the V2X feature information from the subscription information of the UE. For example, the PCF obtains the subscription information of the UE from the UDR, to obtain the V2X feature information. Further, after obtaining the V2X feature information of the UE, the PCF may determine, based on a prestored correspondence between V2X feature information and a V2X configuration parameter, the V2X configuration parameter corresponding to the V2X feature information. Alternatively, when the notification message may carry the location information of the UE, the PCF may determine, based on prestored correspondences among location information, V2X feature information, and a V2X configuration parameter, the V2X configuration parameter corresponding to the location information and the V2X feature information. Specifically, for a manner of determining the V2X configuration parameter by the PCF, refer to the related descriptions of the embodiment shown in FIG. 3. Details are not described herein again.

It should be understood that the subscription information of the UE, the V2X feature information, the V2X authorized area information, and/or the like may be stored by the PCF after being obtained by the PCF for the first time, for example, stored in context information of the UE, so that when the subscription information, the V2X feature information, the V2X authorized area information, and/or the like are subsequently obtained, the subscription information, the V2X feature information, the V2X authorized area information, and/or the like can be directly read, thereby reducing system overheads.

503: The AMF sends the V2X configuration parameter to the UE.

Further, the AMF may receive the V2X configuration parameter of the UE that is from the PCF, and may send the V2X configuration parameter to the UE. When the V2X configuration parameter is sent to the UE, the V2X configuration parameter may be sent to the UE in a process in which the UE is handed over from a source base station corresponding to the preset area to a target base station outside the preset area; or the V2X configuration parameter may be sent to the UE by using a target base station after the UE is handed over from a source base station corresponding to the preset area to the target base station outside the preset area.

Further, optionally, when sending the V2X configuration parameter to the UE, the AMF may further send the V2X feature information corresponding to the determined V2X configuration parameter to the UE together with the V2X configuration parameter, so that the UE performs the V2X service based on the V2X feature information and the corresponding V2X configuration parameter. For details, refer to the related descriptions of the embodiment shown in FIG. 3. Details are not described herein again.

Further, optionally, if the PCF determines that the V2X configuration parameter of the UE is updated, the PCF may send the updated V2X configuration parameter to the UE by using the AMF, notify, by using the AMF, the UE that the V2X configuration parameter of the UE is updated, or the like. For details, refer to the related descriptions of the embodiment shown in FIG. 3. Details are not described herein again.

It should be understood that the technical solutions in the embodiments of the present invention may be used in initial configuration of the V2X configuration parameter of the UE, or may be used in parameter update after the initial configuration of the V2X configuration parameter of the UE. Optionally, if the technical solutions are used in the parameter update after the initial configuration of the V2X configuration parameter of the UE, the initial configuration of the V2X configuration parameter of the UE may be further performed with reference to the technical solution in the embodiment shown in FIG. 3. In this case, the UE has enabled a V2X service, and the UE may be in a connected state (for example, a CONNECTED state).

Figure 6:
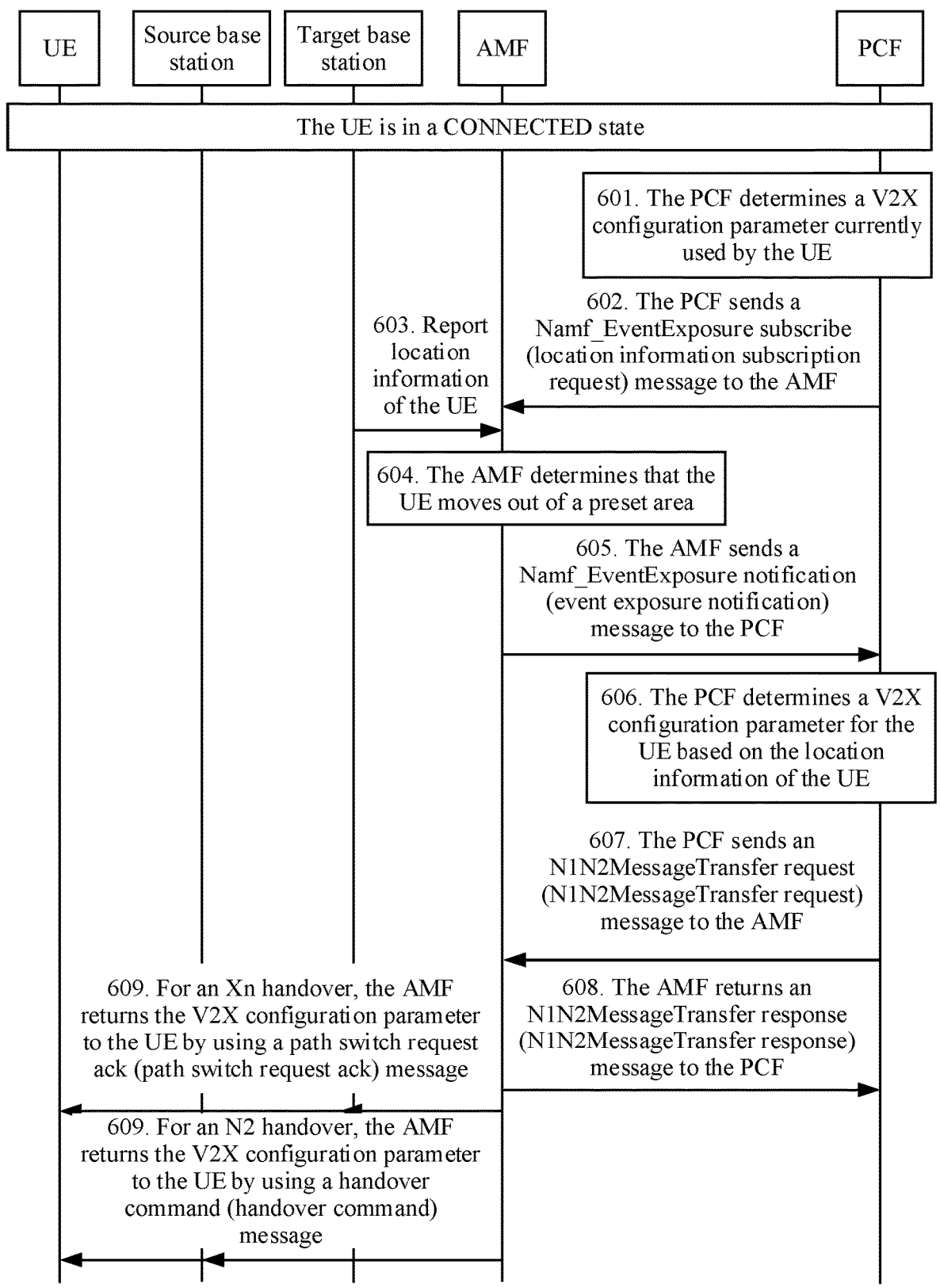
FIG. 6 is a schematic interaction diagram of still another communication method according to an embodiment of the present invention.

FIG. 6 is a schematic interaction diagram of still another communication method according to an embodiment of the present invention. As shown in FIG. 6, the communication method provided in this embodiment of the present invention may be based on the system architecture shown in FIG. 2, and the method may include the following steps.

601: A PCF determines a V2X configuration parameter currently used by UE.

602: The PCF sends a Namf_EventExposure subscribe message to an AMF, where the Namf_EventExposure subscribe message may carry information about a preset area such as an interest area.

The UE may be in a connected state. The PCF stores the V2X configuration parameter currently used by the UE. The PCF may determine, by obtaining the V2X configuration parameter currently used by the UE, authorized area information corresponding to the V2X configuration parameter, and then generate a location information subscription request message such as the Namf_EventExposure subscribe message based on the authorized area information. Optionally, the Namf_EventExposure subscribe message may carry the information about the preset area such as the interest area. For example, the preset area is an authorized area corresponding to the authorized area information.

603: For an Xn handover, a target base station reports location information of the UE (UE location) to the AMF by using a path switch request message; or for an N2 handover, the target base station reports, to the AMF, the location information of the UE by using a handover request acknowledge message.

Optionally, in a process of a handover from a source base station corresponding to the preset area to the target base station outside the preset area, the location information of the UE may be reported by using the source base station, or the location information of the UE may be reported by using another message. For details, refer to the related descriptions of the embodiment shown in FIG. 5. Details are not described herein again.

604: The AMF determines that the UE moves out of the preset area.

The AMF may determine, based on the location information of the UE that is reported by the target base station, whether the UE moves out of the preset area. If the UE moves out, the AMF may perform step 605, to send, to the PCF, a notification message, for example, an event exposure notification message (Namf_EventExposure notification) provided by the AMF.

605: The AMF sends the Namf_EventExposure notification message to the PCF, where the Namf_EventExposure notification message may carry the location information of the UE.

606: The PCF determines a V2X configuration parameter for the UE based on the location information of the UE.

After receiving the Namf_EventExposure notification message sent by the AMF, the PCF may determine the V2X configuration parameter of the UE based on the location information of the UE that is carried in the Namf_EventExposure notification message. Optionally, the PCF may alternatively determine the V2X configuration parameter based on V2X indication information, V2X authorized indication information, and/or the authorized area information of the UE. For a determining manner, refer to the related descriptions of the embodiment shown in FIG. 3. Details are not described herein again.

607: The PCF sends an N1N2 MessageTransfer request message to the AMF, where the N1N2 MessageTransfer request message carries the V2X configuration parameter.

608: The AMF returns the N1N2 MessageTransfer response message to the PCF.

After determining the V2X configuration parameter corresponding to the location information, the PCF may return the V2X configuration parameter to the AMF. For example, the PCF sends, to the AMF, the N1N2 MessageTransfer request message carrying the V2X configuration parameter. After receiving the N1N2 MessageTransfer request message, the AMF may return the N1N2 MessageTransfer response message to the PCF, to indicate that the V2X configuration parameter is received.

609: For the Xn handover, the AMF returns the V2X configuration parameter to the UE by using a path switch request ack message; or for the N2 handover, the AMF returns the V2X configuration parameter to the UE by using a handover command message.

After receiving the V2X configuration parameter, the AMF may return the V2X configuration parameter to the UE. If the handover is the Xn handover, the AMF may send the V2X configuration parameter to the UE by using the target base station. For example, the V2X configuration parameter may be carried in the path switch request ack message and sent to the UE. If the handover is the N2 handover, the AMF may send the V2X configuration parameter to the UE by using the source base station. For example, the V2X configuration parameter may be carried in the handover command message and sent to the UE. Therefore, V2X parameter configuration of the UE can be implemented in the handover process, thereby improving parameter obtaining efficiency, and reducing a communication delay.

In this embodiment of the present invention, information about the V2X configuration parameter can be controlled by the PCF, and sent to the UE by using control plane signaling, so that the V2X configuration parameter can be managed by using a control plane, for example, the V2X configuration parameter of the UE can be managed by an operator by using a control plane, and is no longer managed by using an application layer. This improves security of the information about the V2X configuration parameter. Moreover, in a prior-art manner of performing V2X parameter configuration by using a V2X control function at an application layer, whether the UE needs to perform V2X parameter configuration or update cannot be sensed in time, and in this case, the V2X parameter cannot be updated in time. For example, when the UE enters a new location area, and at this time, the UE is requesting to perform communication, for example, ProSe direct communication (Proximity Direct Communication), ProSe direct discovery (Proximity Direct Discovery), or Uu interface communication, the UE temporarily requests a new V2X parameter from the V2X control function only when the UE finds that a current V2X parameter cannot be used. Consequently, a V2X service cannot be transmitted, a V2X communication delay is relatively high, and even current ongoing communication may be interrupted. Compared with the prior art, in this embodiment of the present invention, when the UE moves out of the preset area, the PCF may send the V2X configuration parameter to the UE in time by using the AMF in a process in which the UE performs base station handover, so that the UE can perform a V2X service such as V2X communication in time by using the V2X configuration parameter. The manner of obtaining (configuring or updating) the V2X configuration parameter helps reduce a communication delay, thereby meeting a requirement of V2X low-delay communication.

Figure 7:
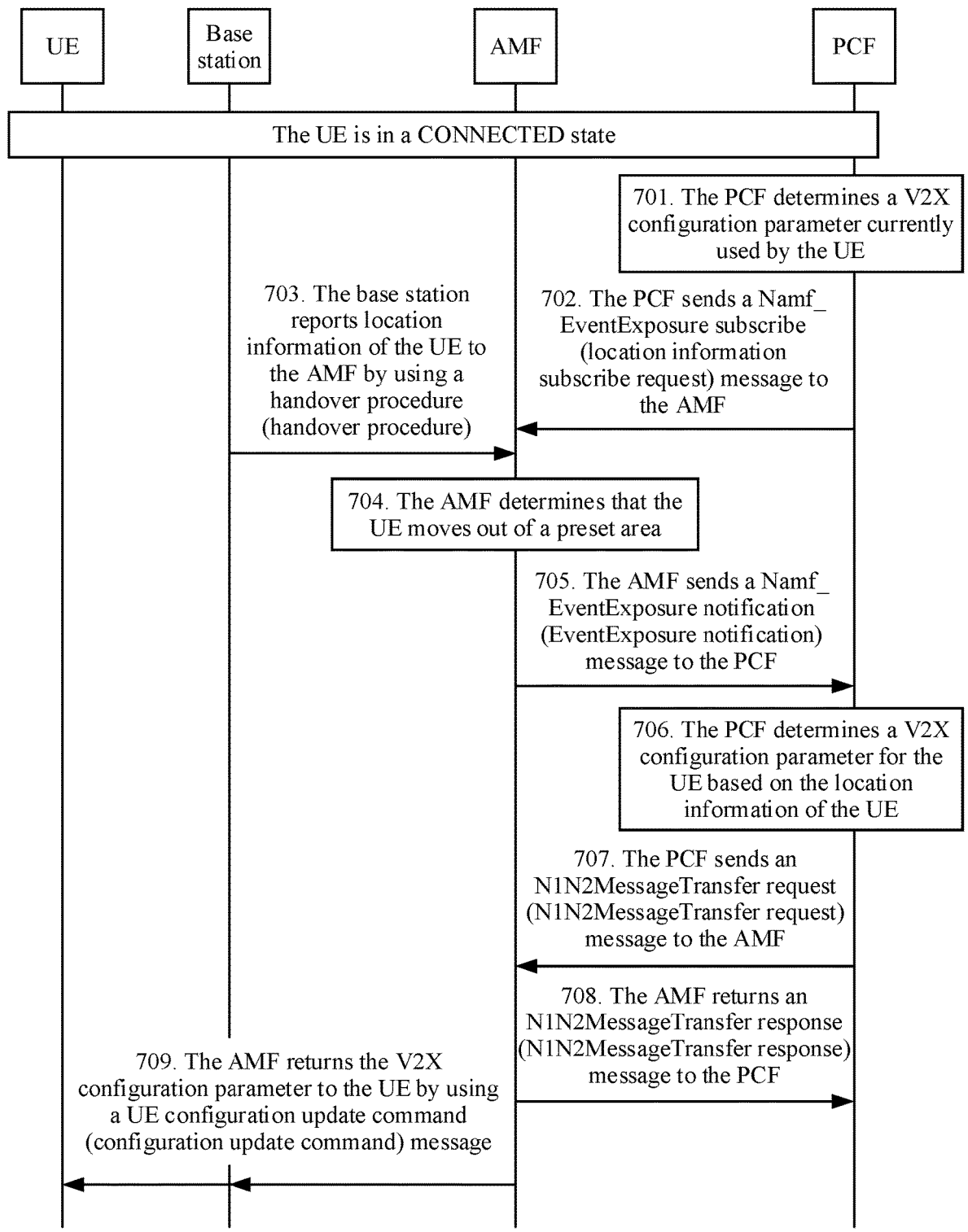
FIG. 7 is a schematic interaction diagram of still another communication method according to an embodiment of the present invention.

FIG. 7 is a schematic interaction diagram of still another communication method according to an embodiment of the present invention. As shown in FIG. 7, the communication method provided in this embodiment of the present invention may be based on the system architecture shown in FIG. 2, and the method may include the following steps.

701: A PCF determines a V2X configuration parameter currently used by UE.

702: The PCF sends a Namf_EventExposure subscribe message to an AMF, where the Namf_EventExposure subscribe message may carry information about a preset area such as an interest area.

For descriptions of steps 701 and 702, refer to the related descriptions of steps 601 and 602 in the embodiment shown in FIG. 6. Details are not described herein again.

703: A base station reports location information of the UE (UE location) to the AMF by using a handover procedure.

Optionally, a target base station or a source base station may report the location information of the UE to the AMF by using a handover procedure. For a specific manner of reporting the location information of the UE by the target base station or the source base station, refer to the related descriptions of the embodiment shown in FIG. 5. Details are not described herein again.

704: The AMF determines that the UE moves out of the preset area.

The AMF may determine, based on the location information of the UE that is reported by the target base station, whether the UE moves out of the preset area. If the UE moves out, the AMF may perform step 605, to send, to the PCF, a notification message, for example, a Namf_EventExposure notification message.

705: The AMF sends the Namf_EventExposure notification message to the PCF, where the Namf_EventExposure notification message may carry the location information of the UE.

706: The PCF determines a V2X configuration parameter for the UE based on the location information of the UE.

707: The PCF sends an N1N2 MessageTransfer request message to the AMF, where the N1N2 MessageTransfer request message carries the V2X configuration parameter.

708: The AMF returns an N1N2 MessageTransfer response message to the PCF.

For descriptions of steps 704 to 708, refer to the related descriptions of steps 604 to 608 in the embodiment shown in FIG. 6. Details are not described herein again.

709: The AMF returns the V2X configuration parameter to the UE by using a UE configuration update command message.

Further, the AMF may receive the V2X configuration parameter of the UE from the PCF, and may send the V2X configuration parameter to the UE. When the V2X configuration parameter is sent to the UE, the V2X configuration parameter may be sent to the UE by using the target base station after the UE is handed over from the source base station corresponding to the preset area to the target base station outside the preset area. For example, the AMF may send the V2X configuration parameter to the UE by using the target base station. For example, the V2X configuration parameter may be carried in a UE configuration update command message and sent to the UE. The handover may be an Xn handover, or may be an N2 handover. Therefore, V2X parameter configuration of the UE can be implemented after the handover is completed, thereby improving parameter obtaining reliability, and reducing a communication delay.

In this embodiment of the present invention, information about the V2X configuration parameter can be controlled by the PCF, and sent to the UE by using control plane signaling, so that the V2X configuration parameter can be managed by using a control plane, for example, the V2X configuration parameter of the UE can be managed by an operator by using a control plane, and is no longer managed by using an application layer. This improves security of the information about the V2X configuration parameter. In addition, when the UE moves out of the preset area, the PCF may send the V2X configuration parameter to the UE in time by using the AMF after the UE completes base station handover, so that the UE can perform a V2X service such as V2X communication in time by using the V2X configuration parameter. This helps reduce a communication delay, thereby meeting a requirement of V2X low-delay communication.

It should be understood that, in this embodiment of the present invention, a process of obtaining the V2X configuration parameter is described by using the AMF and the PCF as examples. In another communications system such as a 4G communications system, the UE may alternatively obtain the V2X configuration parameter by using an MME and a PCRF, the UE may obtain the V2X configuration parameter by using the MME and a V2X control function, the UE may obtain the V2X configuration parameter by using the AMF and the V2X control function, or the UE may obtain the V2X configuration parameter of the UE by using another network element. An obtaining process is similar to the obtaining process in the scenario in which the AMF and the PCF are used, and details are not described herein again.

Figure 8:
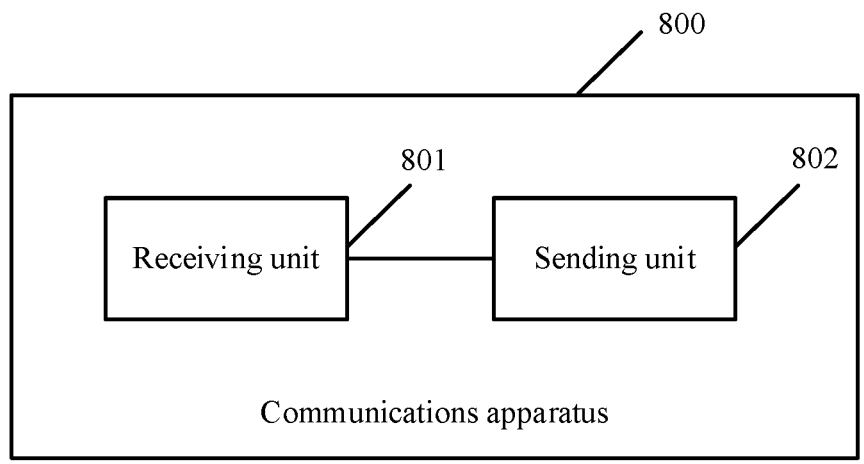
FIG. 8 is a schematic structural diagram of a communications apparatus according to an embodiment of the present invention.

FIG. 8 is a possible schematic structural diagram of a communications apparatus in the foregoing embodiments. The communications apparatus may be a mobility management network element, or may be at least one processing element or chip. Refer to FIG. 8. The communications apparatus 800 may include a receiving unit 801 and a sending unit 802. These units may perform corresponding functions of the mobility management network element such as the AMF in the foregoing method examples. For example, the receiving unit 801 is configured to receive a registration request message from a terminal, where the registration request message is used to request a V2X configuration parameter for the terminal, and the V2X configuration parameter is used by the terminal to perform a V2X service. The sending unit 802 is configured to send a parameter request message to a V2X parameter configuration network element based on the registration request message, where the parameter request message is used to request the V2X configuration parameter of the terminal from the V2X parameter configuration network element. The receiving unit 801 is further configured to receive the V2X configuration parameter from the V2X parameter configuration network element. The sending unit 802 is further configured to send the V2X configuration parameter to the terminal.

Optionally, the parameter request message includes V2X indication information, and V2X feature information of the terminal; V2X indication information; V2X authorized indication information; V2X feature information of the terminal; or V2X authorized indication information, and V2X feature information of the terminal. The V2X indication information may be used to indicate the V2X parameter configuration network element to return the V2X configuration parameter to the communications apparatus, and the V2X authorized indication information is used to indicate that the terminal is authorized to use the V2X service and/or the terminal supports the V2X service.

Optionally, the parameter request message includes the V2X feature information.

The sending unit 802 may be specifically configured to send the V2X feature information in subscription information of the terminal to the V2X parameter configuration network element.

Optionally, the sending unit 802 may be specifically configured to: when the terminal is authorized to use the V2X service, and the registration request message carries capability indication information used to indicate that the terminal supports the V2X service, send the parameter request message to the V2X parameter configuration network element; or when the terminal is authorized to use the V2X service, send the parameter request message to the V2X parameter configuration network element.

Optionally, the sending unit 802 may be further configured to send location information of the terminal to the V2X parameter configuration network element, where the location information is used by the V2X parameter configuration network element to determine the V2X configuration parameter of the terminal.

Optionally, the sending unit 802 is further configured to send, to the V2X parameter configuration network element, authorized area information in the subscription information of the terminal, where the authorized area information is used by the V2X parameter configuration network element to determine the V2X configuration parameter of the terminal.

Further, optionally, the communications apparatus may further include a processing unit. For example, the processing unit may be used to obtain the subscription information, the V2X feature information, the authorized area information, and the like. Further, optionally, the communications apparatus may further include a storage unit. For example, the storage unit may be configured to store the subscription information, the V2X feature information, the authorized area information, and the like.

It should be understood that, in this embodiment of the present invention, unit division is an example, and is merely logical function division. During actual implementation, another division manner may be used. Functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

Optionally, the communications apparatus may implement, by using the foregoing units, a part or all of the steps performed by the AMF in the communication methods in the embodiments shown in FIG. 3 to FIG. 7. It should be understood that this embodiment of the present invention is an apparatus embodiment corresponding to the method embodiment, and descriptions of the method embodiment are also applicable to this embodiment of the present invention.

Figure 9:
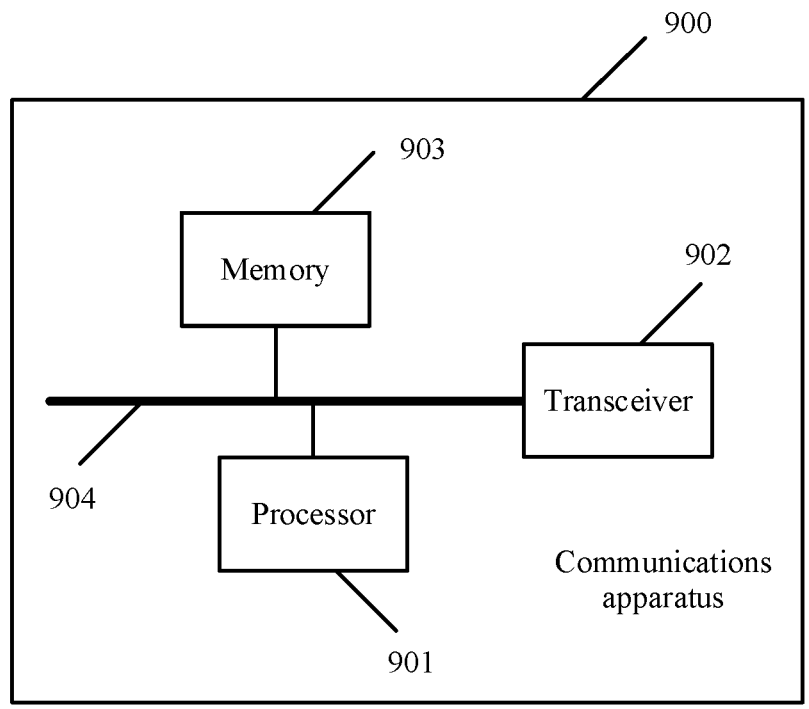
FIG. 9 is a schematic structural diagram of another communications apparatus according to an embodiment of the present invention.

As shown in FIG. 9, in another embodiment, a communications apparatus 900 may include a processor 901 and a transceiver 902. Optionally, the communications apparatus may further include a memory 903. The processor 901, the transceiver 902, and the memory 903 may be connected to each other. For example, the processor 901, the transceiver 902, and the memory 903 may be connected to each other by using a bus 904. The bus 904 may be a peripheral component interconnect (PCI for short) bus, an extended industry standard architecture (EISA for short) bus, or the like. The bus may be classified into an address bus, a data bus, a control bus, and the like. For ease of representation, only one thick line is used to represent the bus in FIG. 9, but this does not mean that there is only one bus or only one type of bus.

The processor 901 may be a processor or a controller, for example, may be a central processing unit (CPU for short), a general purpose processor, a digital signal processor (DSP for short), an application-specific integrated circuit (ASIC for short), a field programmable gate array (FPGA for short) or another programmable logic device, a transistor logic device, or a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The transceiver 902 may include an independent receiver and an independent transmitter, or may be obtained by integrating the receiver and the transmitter.

The processor 901 is configured to control and manage an action of the communications apparatus such as a mobility management network element. For example, the processor 901 may be configured to support the communications apparatus in performing the process 302 in FIG. 3, the process 402 in FIG. 4, and/or another process of the technology described in this specification. The transceiver 902 may perform a communications function, to support communication between the communications apparatus and another network entity such as a V2X parameter configuration network element, for example, communication between the communications apparatus and a functional unit or a network entity such as the PCF shown in FIG. 3 to FIG. 7. Specifically, the processor 901 is configured to determine to receive or send a signal, and control a communications function. To be specific, when receiving or sending a signal, the processor 901 controls or drives the transceiver 902 to perform related receiving or sending. The transceiver 902 may implement a specific communication operation under control of the processor 901, and is an executor of a communication function.

Further, the memory 903 may be configured to store at least one of program code and data of the communications apparatus. When the processor 901 works under driving of software such as a CPU, a DSP, or a microcontroller, the processor 901 may read program code stored in the memory 903 and work under driving of the program code.

Method or algorithm steps described in combination with the content disclosed in the present invention may be implemented by hardware, or may be implemented by a processor by executing a software instruction. The software instruction may include a corresponding software module. The software module may be stored in a random access memory (RAM for short), a flash memory, a read-only memory (ROM for short), an erasable programmable read only memory (EPROM for short), an electrically erasable programmable read only memory (electrically EPROM, EEPROM for short), a register, a hard disk, a mobile hard disk, a compact disc read-only memory (CD-ROM for short), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a communications apparatus. Certainly, the processor and the storage medium may exist in the mobility management network element as discrete components.

Figure 10:
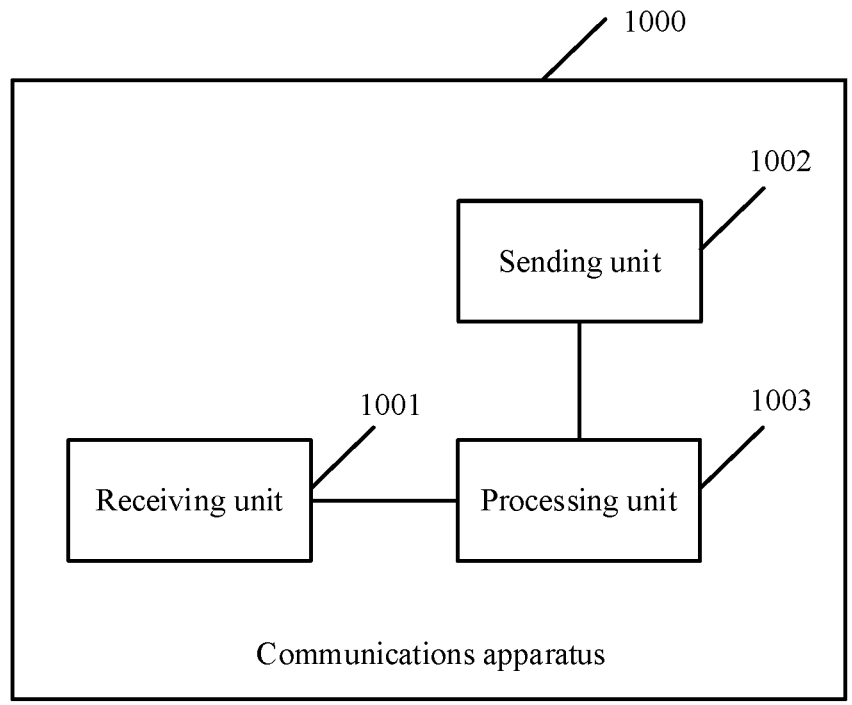
FIG. 10 is a schematic structural diagram of still another communications apparatus according to an embodiment of the present invention.

FIG. 10 is a possible schematic structural diagram of a communications apparatus in the foregoing embodiments. The communications apparatus may be a V2X parameter configuration network element, or may be at least one processing element or chip. Refer to FIG. 10. The communications apparatus 1000 may include a receiving unit 1001 and a sending unit 1002. These units may perform corresponding functions of the V2X parameter configuration network element such as the PCF in the foregoing method examples. For example, the receiving unit 1001 may be configured to receive a parameter request message from a mobility management network element. The sending unit 1002 is configured to send a V2X configuration parameter of a terminal to the mobility management network element based on the parameter request message, where the V2X configuration parameter is used by the terminal to perform a V2X service.

Optionally, the parameter request message includes V2X indication information, and V2X feature information of the terminal; V2X indication information; V2X authorized indication information; V2X feature information of the terminal; or V2X authorized indication information, and V2X feature information of the terminal. The V2X indication information is used to indicate the communications apparatus to return the V2X configuration parameter to the mobility management network element, and the V2X authorized indication information is used to indicate that the terminal is authorized to use the V2X service and/or the terminal supports the V2X service.

Optionally, the network element further includes a processing unit 1003.

The processing unit 1003 is configured to: when the parameter request message includes the V2X feature information, determine, based on a prestored correspondence between V2X feature information and a V2X configuration parameter, the V2X configuration parameter corresponding to the V2X feature information; when the parameter request message includes the V2X indication information or the V2X authorized indication information, determine the V2X configuration parameter of the terminal; or when the parameter request message includes the V2X indication information and the V2X feature information, or the parameter request message includes the V2X authorized indication information and the V2X feature information, determine, based on a prestored correspondence between V2X feature information and a V2X configuration parameter, the V2X configuration parameter corresponding to the V2X feature information.

Optionally, the network element further includes a processing unit 1003.

The receiving unit 1001 is further configured to receive location information of the terminal that is from the mobility management network element.

The processing unit 1003 is configured to determine, based on a prestored correspondence between location information and a V2X configuration parameter, the V2X configuration parameter corresponding to the location information; or when the parameter request message includes the V2X feature information of the terminal, determine, based on prestored correspondences among location information, V2X feature information, and a V2X configuration parameter, the V2X configuration parameter corresponding to the location information and the V2X feature information.

Optionally, the network element further includes a processing unit 1003.

The receiving unit 1001 is further configured to receive authorized area information of the terminal and location information of the terminal that are from the mobility management network element.

The processing unit 1003 is configured to: when a location corresponding to the location information is in an area corresponding to the authorized area information, determine the V2X configuration parameter of the terminal based on the parameter request message.

Further, optionally, the processing unit may further obtain the subscription information, the V2X feature information, the authorized area information, and the like. Further, optionally, the mobility management network element may further include a storage unit. For example, the storage unit may be configured to store the subscription information, the V2X feature information, the authorized area information, and the like.

It should be understood that, in this embodiment of the present invention, unit division is an example, and is merely logical function division. During actual implementation, another division manner may be used. Functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

Optionally, the communications apparatus may implement, by using the foregoing units, a part or all of the steps performed by the PCF in the communication methods in the embodiments shown in FIG. 3 to FIG. 5. It should be understood that this embodiment of the present invention is an apparatus embodiment corresponding to the method embodiment, and descriptions of the method embodiment are also applicable to this embodiment of the present invention.

Figure 11:
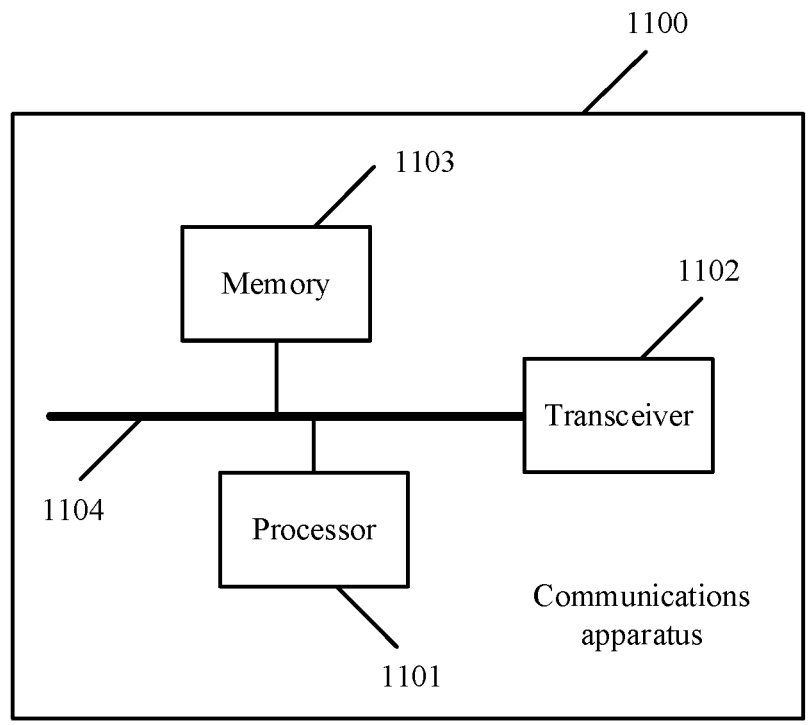
FIG. 11 is a schematic structural diagram of still another communications apparatus according to an embodiment of the present invention.

Refer to FIG. 11. In another embodiment, a communications apparatus such as a V2X parameter configuration network element 1100 may include a processor 1101 and a transceiver 1102. Optionally, the communications apparatus may further include a memory 1103. The processor 1101, the transceiver 1102, and the memory 1103 may be connected to each other. For example, the processor 1101, the transceiver 1102, and the memory 1103 may be connected to each other by using a bus 1104. The bus 1104 may be a PCI bus, an EISA bus, or the like. The bus may be classified into an address bus, a data bus, a control bus, and the like. For ease of representation, only one thick line is used to represent the bus in FIG. 11, but this does not mean that there is only one bus or only one type of bus.

The processor 1101 may be a processor or a controller, for example, may be a CPU, a general purpose processor, a DSP, an ASIC, an FPGA, or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The transceiver 1102 may include an independent receiver and an independent transmitter, or may be obtained by integrating the receiver and the transmitter.

The processor 1101 is configured to control and manage an action of the communications apparatus. For example, the processor 1101 may be configured to support the communications apparatus in performing the process 303 in FIG. 3, the process 405 in FIG. 4, and/or another process of the technology described in this specification. The transceiver 1102 may perform a communications function, to support communication between the communications apparatus and another network entity such as a mobility management network element, for example, communication between the communications apparatus and a functional unit or a network entity such as the AMF shown in FIG. 3 to FIG. 7. Specifically, the processor 1101 is configured to determine to receive or send a signal, and is a controller of a communications function. To be specific, when receiving or sending a signal, the processor 1101 controls or drives the transceiver 1102 to perform related receiving or sending. The transceiver 1102 may implement a specific communication operation under control of the processor 1101, and is an executor of a communication function.

Further, the memory 1103 may be configured to store at least one of program code and data of the communications apparatus. When the processor 1101 works under driving of software such as a CPU, a DSP, or a microcontroller, the processor 1101 may read program code stored in the memory 1103 and work under driving of the program code.

Method or algorithm steps described in combination with the content disclosed in the present invention may be implemented by hardware, or may be implemented by a processor by executing a software instruction. The software instruction may include a corresponding software module. The software module may be stored in a random access memory (RAM for short), a flash memory, a read-only memory (ROM), an erasable programmable read only memory (EPROM), an electrically erasable programmable read only memory (Electrically EPROM, EEPROM), a register, a hard disk, a mobile hard disk, a compact disc read-only memory (CD-ROM), or any other form of storage medium well-known in the art. For example, a storage medium may be coupled to a processor, so that the processor can read information from the storage medium or write information into the storage medium. Certainly, the storage medium may be a component of the processor. The processor and the storage medium may be located in the ASIC. In addition, the ASIC may be located in a communications apparatus. Certainly, the processor and the storage medium may exist in the communications apparatus as discrete components.

Figure 12:
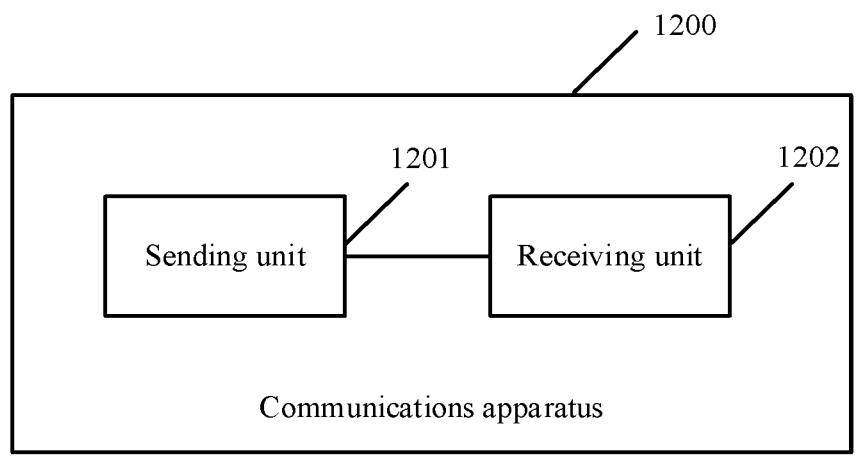
FIG. 12 is a schematic structural diagram of still another communications apparatus according to an embodiment of the present invention.

FIG. 12 is still another possible schematic structural diagram of a communications apparatus in the foregoing embodiments. The communications apparatus may be a mobility management network element, or may be at least one processing element or chip. Refer to FIG. 12. The communications apparatus 1200 may include a sending unit 1201 and a receiving unit 1202. These units may perform corresponding functions of the mobility management network element such as the AMF in the foregoing method examples. For example, the sending unit 1201 may be configured to: when it is determined, based on location information of a terminal, that the terminal moves out of a preset area, send a notification message to a V2X parameter configuration network element, where the notification message is used to notify that the terminal moves out of the preset area. The receiving unit 1202 is configured to receive a V2X configuration parameter of the terminal from the V2X parameter configuration network element, where the V2X configuration parameter is used by the terminal to perform a V2X service outside the preset area. The sending unit 1201 is further configured to send the V2X configuration parameter to the terminal.

Optionally, the notification message carries the location information of the terminal, and the location information is used by the V2X parameter configuration network element to determine the V2X configuration parameter of the terminal.

Optionally, the sending unit 1201 may be further configured to send, to the V2X parameter configuration network element, V2X feature information in subscription information of the terminal, where the V2X feature information is used by the V2X parameter configuration network element to determine the V2X configuration parameter of the terminal.

Optionally, the sending unit 1201 may be specifically configured to send the V2X configuration parameter to the terminal by using a target base station in an Xn handover process of the terminal from a source base station in the preset area to the target base station outside the preset area.

Optionally, the sending unit 1201 may be specifically configured to send the V2X configuration parameter to the terminal by using a source base station in an N2 handover process of the terminal from the source base station in the preset area to a target base station outside the preset area.

Optionally, the sending unit 1201 may be specifically configured to send the V2X configuration parameter to the terminal by using a target base station after the terminal is handed over from a source base station in the preset area to the target base station outside the preset area.

Optionally, the receiving unit 1202 may be further configured to receive a location information subscription request message from the V2X parameter configuration network element, where the location information subscription request message is used to request to send the notification message to the V2X parameter configuration network element when the terminal moves out of the preset area.

Optionally, the receiving unit 1202 may be further configured to send authorized area information in the subscription information of the terminal to the V2X parameter configuration network element.

Further, optionally, the communications apparatus may further include a processing unit. For example, the processing unit may be used to obtain the subscription information, the V2X feature information, the authorized area information, and the like. Further, optionally, the communications apparatus may further include a storage unit. For example, the storage unit may be configured to store the subscription information, the V2X feature information, the authorized area information, and the like.

It should be understood that, in this embodiment of the present invention, unit division is an example, and is merely logical function division. During actual implementation, another division manner may be used. Functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

Optionally, the communications apparatus may implement, by using the foregoing units, a part or all of the steps performed by the AMF in the communication methods in the embodiments shown in FIG. 3 to FIG. 7. It should be understood that this embodiment of the present invention is an apparatus embodiment corresponding to the method embodiment, and descriptions of the method embodiment are also applicable to this embodiment of the present invention.

Figure 13:
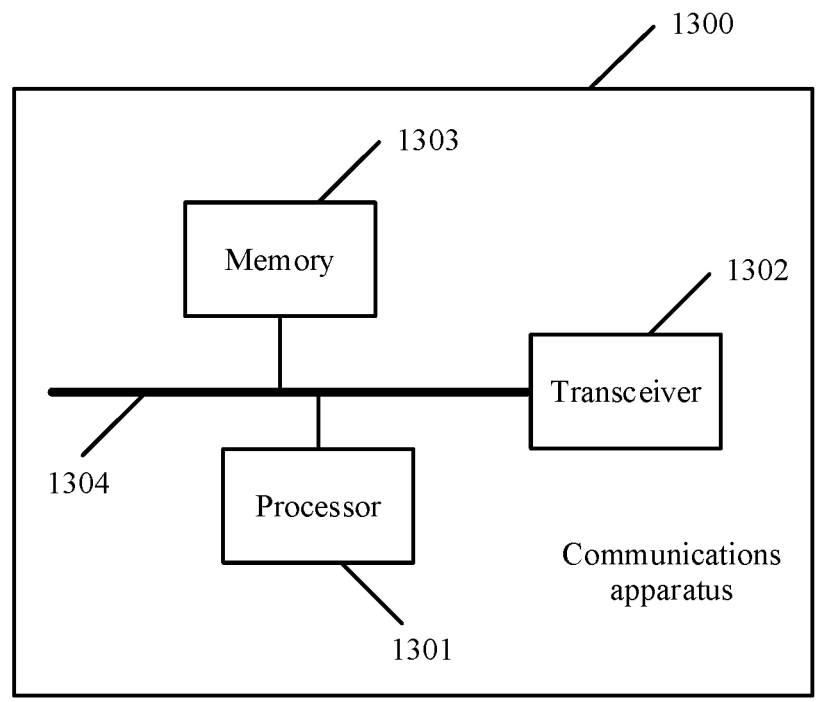
FIG. 13 is a schematic structural diagram of still another communications apparatus according to an embodiment of the present invention.

Refer to FIG. 13. In another embodiment, a communications apparatus such as a mobility management network element 1300 may include a processor 1301 and a transceiver 1302. Optionally, the communications apparatus may further include a memory 1303. The processor 1301, the transceiver 1302, and the memory 1303 may be connected to each other. For example, the processor 1301, the transceiver 1302, and the memory 1303 may be connected to each other by using a bus 1304. The bus 1304 may be a PCI bus, an EISA bus, or the like. The bus may be classified into an address bus, a data bus, a control bus, and the like. For ease of representation, only one thick line is used to represent the bus in FIG. 13, but this does not mean that there is only one bus or only one type of bus.

The processor 1301 may be a processor or a controller, for example, may be a CPU, a general purpose processor, a DSP, an ASIC, an FPGA, or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The transceiver 1302 may include an independent receiver and an independent transmitter, or may be obtained by integrating the receiver and the transmitter.

The processor 1301 is configured to control and manage an action of the communications apparatus. For example, the processor 1301 may be configured to support the communications apparatus in performing the process 501 in FIG. 5, the process 604 in FIG. 6, the process 704 in FIG. 7, and/or another process of the technology described in this specification. The transceiver 1302 may perform a communications function, to support communication between the communications apparatus and another network entity such as a V2X parameter configuration network element, for example, communication between the communications apparatus and a functional unit or a network entity such as the PCF shown in FIG. 3 to FIG. 7. Specifically, the processor 1301 is configured to determine to receive or send a signal, and is a controller of a communications function. To be specific, when receiving or sending a signal, the processor 1301 controls or drives the transceiver 1302 to perform related receiving or sending. The transceiver 1302 may implement a specific communication operation under control of the processor 1301, and is an executor of a communication function.

Further, the memory 1303 may be configured to store at least one of program code and data of the communications apparatus. When the processor 1301 works under driving of software such as a CPU, a DSP, or a microcontroller, the processor 1301 may read program code stored in the memory 1303 and work under driving of the program code.

Method or algorithm steps described in combination with the content disclosed in the present invention may be implemented by hardware, or may be implemented by a processor by executing a software instruction. The software instruction may include a corresponding software module. The software module may be stored in a random access memory (RAM for short), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium may be coupled to a processor, so that the processor can read information from the storage medium or write information into the storage medium. Certainly, the storage medium may be a component of the processor. The processor and the storage medium may be located in the ASIC. In addition, the ASIC may be located in a communications apparatus. Certainly, the processor and the storage medium may exist in the communications apparatus as discrete components.

Figure 14:
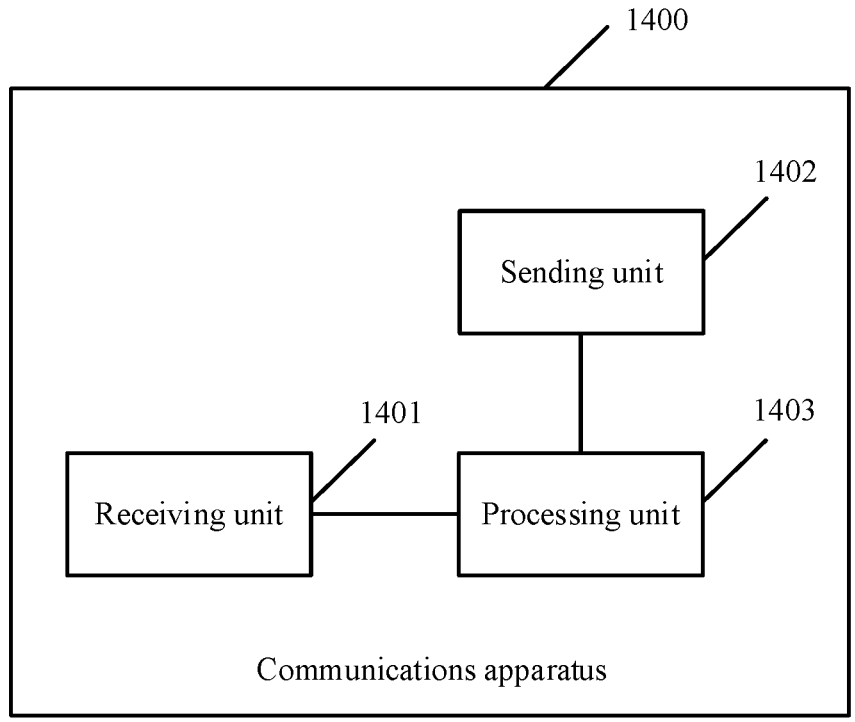
FIG. 14 is a schematic structural diagram of still another communications apparatus according to an embodiment of the present invention.

FIG. 14 is still another possible schematic structural diagram of a communications apparatus in the foregoing embodiments. The communications apparatus may be a V2X parameter configuration network element, or may be at least one processing element or chip. Refer to FIG. 14. The communications apparatus 1400 may include a receiving unit 1401 and a sending unit 1402. These units may perform corresponding functions of the V2X parameter configuration network element such as the PCF in the foregoing method examples. For example, the receiving unit 1401 may be configured to receive a notification message from a mobility management network element, where the notification message is used to notify that a terminal moves out of a preset area. The sending unit 1402 is configured to send a V2X configuration parameter of the terminal to the mobility management network element based on the notification message, where the V2X configuration parameter is used by the terminal to perform a V2X service outside the preset area.

Optionally, the notification message carries location information of the terminal, and the network element may further include a processing unit 1403.

The processing unit 1403 is configured to determine, based on a prestored correspondence between location information and a V2X configuration parameter, the V2X configuration parameter corresponding to the location information.

Optionally, the communications apparatus further includes a processing unit 1403.

The receiving unit 1401 is further configured to receive V2X feature information of the terminal that is from the mobility management network element.

The processing unit 1403 is configured to: determine, based on a prestored correspondence between V2X feature information and a V2X configuration parameter, the V2X configuration parameter corresponding to the V2X feature information; or when the notification message carries location information of the terminal, determine, based on prestored correspondences among location information, V2X feature information, and a V2X configuration parameter, the V2X configuration parameter corresponding to the location information and the V2X feature information.

Optionally, the sending unit 1402 is further configured to send a location information subscription request message to the mobility management network element, where the location information subscription request message is used to request to send the notification message to the communications apparatus when the terminal moves out of the preset area.

Optionally, the network element further includes a processing unit 1403.

The receiving unit 1401 is further configured to receive authorized area information of the terminal that is from the mobility management network element.

The processing unit 1403 is configured to generate the location information subscription request message based on the authorized area information, where the preset area includes an authorized area corresponding to the authorized area information.

Further, optionally, the processing unit may further obtain the subscription information, the V2X feature information, the authorized area information, and the like. Further, optionally, the mobility management network element may further include a storage unit. For example, the storage unit may be configured to store the subscription information, the V2X feature information, the authorized area information, and the like.

It should be understood that, in this embodiment of the present invention, unit division is an example, and is merely logical function division. During actual implementation, another division manner may be used. Functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

Optionally, the communications apparatus may implement, by using the foregoing units, a part or all of the steps performed by the PCF in the communication methods in the embodiments shown in FIG. 3 to FIG. 5. It should be understood that this embodiment of the present invention is an apparatus embodiment corresponding to the method embodiment, and descriptions of the method embodiment are also applicable to this embodiment of the present invention.

Figure 15:
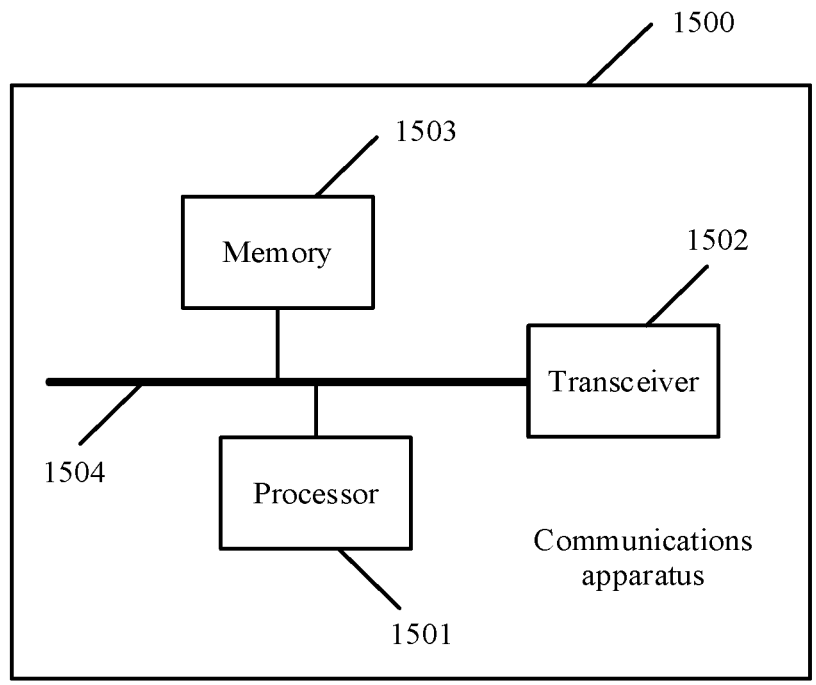
FIG. 15 is a schematic structural diagram of still another communications apparatus according to an embodiment of the present invention.

Refer to FIG. 15. In another embodiment, a communications apparatus such as a V2X parameter configuration network element 1500 may include a processor 1501 and a transceiver 1502. Optionally, the communications apparatus may further include a memory 1503. The processor 1501, the transceiver 1502, and the memory 1503 may be connected to each other. For example, the processor 1501, the transceiver 1502, and the memory 1503 may be connected to each other by using a bus 1504. The bus 1504 may be a PCI bus, an EISA bus, or the like. The bus may be classified into an address bus, a data bus, a control bus, and the like. For ease of representation, only one thick line is used to represent the bus in FIG. 15, but this does not mean that there is only one bus or only one type of bus.

The processor 1501 may be a processor or a controller, for example, may be a CPU, a general purpose processor, a DSP, an ASIC, an FPGA, or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The transceiver 1502 may include an independent receiver and an independent transmitter, or may be obtained by integrating the receiver and the transmitter.

The processor 1501 is configured to control and manage an action of the communications apparatus. For example, the processor 1501 may be configured to support the communications apparatus in performing the process 502 in FIG. 5, the processes 601 and 606 in FIG. 6, the processes 701 and 706 in FIG. 7, and/or another process of the technology described in this specification. The transceiver 1502 may perform a communications function, to support communication between the communications apparatus and another network entity such as a mobility management network element, for example, communication between the communications apparatus and a functional unit or a network entity such as the AMF shown in FIG. 3 to FIG. 7. Specifically, the processor 1501 is configured to determine to receive or send a signal, and is a controller of a communications function. To be specific, when receiving or sending a signal, the processor 1501 controls or drives the transceiver 1502 to perform related receiving or sending. The transceiver 1502 may implement a specific communication operation under control of the processor 1501, and is an executor of a communication function.

Further, the memory 1503 may be configured to store at least one of program code and data of the communications apparatus. When the processor 1501 works under driving of software such as a CPU, a DSP, or a microcontroller, the processor 1501 may read program code stored in the memory 1503 and work under driving of the program code.

Method or algorithm steps described in combination with the content disclosed in the present invention may be implemented by hardware, or may be implemented by a processor by executing a software instruction. The software instruction may include a corresponding software module. The software module may be stored in a random access memory (RAM for short), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium may be coupled to a processor, so that the processor can read information from the storage medium or write information into the storage medium. Certainly, the storage medium may be a component of the processor. The processor and the storage medium may be located in the ASIC. In addition, the ASIC may be located in a communications apparatus. Certainly, the processor and the storage medium may exist in the communications apparatus as discrete components.

This application further provides a communications system. The system includes the foregoing mobility management network element such as the AMF and the foregoing V2X parameter configuration network element such as the PCF. Optionally, the system may further include another device that interacts with the foregoing network element in the solutions provided in the embodiments of the present invention, for example, a device in a core network.

In an implementation process, steps in the foregoing methods can be implemented by using a hardware integrated logical circuit in the processor, or by using instructions in a form of software. The steps of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should further be understood that the "first", "second", "third" and various digital numbers in this specification are merely for differentiation for ease of description, and are not intended to limit the scope of the embodiments of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of the present invention.

A person of ordinary skill in the art may be aware that, in combination with illustrative logical blocks (illustrative logical block) described in the embodiments disclosed in this specification and steps (step) may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

What is claimed is:

1. A communication method, comprising:
receiving, by a mobility management network element, a registration request message from a terminal;
sending, by the mobility management network element, a parameter request message to a vehicle-to-everything (V2X) parameter configuration network element based on the registration request message, wherein the parameter request message carries capability indication information used to indicate that the terminal supports V2X communication over PC5 and wherein the parameter request message is used to request a V2X configuration parameter of the terminal from the V2X parameter configuration network element, wherein the V2X parameter configuration network element is a control plane network element deployed by a network operator and is a policy and charging function element;
sending, by the V2X parameter configuration network element, the V2X configuration parameter to the mobility management network element based on the parameter request message;
receiving, by the mobility management network element, the V2X configuration parameter from the V2X parameter configuration network element; and
sending, by the mobility management network element, the V2X configuration parameter to the terminal, wherein the V2X configuration parameter can be used by the terminal to perform a V2X service.

2. The method according to claim 1, wherein the sending, by the mobility management network element, a parameter request message to a V2X parameter configuration network element based on the registration request message comprises:
in case that the terminal is authorized to use the V2X service, sending, by the mobility management network element the parameter request message to the V2X parameter configuration network element.

3. The method according to claim 1, wherein the method further comprises:
sending, by the mobility management network element, location information of the terminal to the V2X parameter configuration network element, wherein the location information is used by the V2X parameter configuration network element to determine the V2X configuration parameter of the terminal; and
determining, by the V2X parameter configuration network element based on a prestored correspondence between location information and a V2X configuration parameter, the V2X configuration parameter corresponding to the location information.

4. The method according to claim 1, wherein the method further comprises:
in case that the mobility management network element determines, based on location information of the terminal, that the terminal moves out of a preset area, sending, by the mobility management network element, a notification message to the V2X parameter configuration network element, wherein the notification message is used to notify that the terminal moves out of the preset area;
sending, by the V2X parameter configuration network element, a V2X configuration parameter of the terminal to the mobility management network element, wherein the V2X configuration parameter can be used by the terminal to perform a V2X service outside the preset area.

5. The method according to claim 4, wherein the preset area is a public land mobile network (PLMN) of the terminal.

6. The method according to claim 1, wherein the V2X configuration parameter comprises a parameter used for V2X communication over PC5.

7. The method according to claim 1, wherein registration request message carries the capability indication information.

8. A communication system including a memory storage and one or more processors in communication with the memory storage, the communication system comprising: a mobility management network element, and a vehicle-to-everything (V2X) parameter configuration network element, wherein
the mobility management network element is configured to receive a registration request message from a terminal, and send a parameter request message to the V2X parameter configuration network element based on the registration request message, wherein the parameter request message carries capability indication information used to indicate that the terminal supports V2X communication over PC5 and wherein the parameter request message can be used to request a V2X configuration parameter of the terminal from the V2X parameter configuration network element, wherein the V2X parameter configuration network element is a control plane network element deployed by a network operator and is a policy and charging function element;
the V2X parameter configuration network element is configured to send the V2X configuration parameter to the mobility management network element based on the parameter request message; and
the mobility management network element is further configured to receive the V2X configuration parameter from the V2X parameter configuration network element, and send the V2X configuration parameter to the terminal, wherein the V2X configuration parameter is used by the terminal to perform a V2X service.

9. The system according to claim 8, wherein the mobility management network element is further configured to:
in case that the terminal is authorized to use the V2X service, a, send the parameter request message to the V2X parameter configuration network element.

10. The system according to claim 8, wherein
the mobility management network element is further configured to send location information of the terminal to the V2X parameter configuration network element, wherein the location information is used by the V2X parameter configuration network element to determine the V2X configuration parameter of the terminal; and
the V2X parameter configuration network element is further configured to determine, based on a prestored correspondence between location information and a V2X configuration parameter, the V2X configuration parameter corresponding to the location information.

11. The system according to claim 8, wherein
the mobility management network element is further configured to: determine, based on location information of the terminal, that the terminal moves out of a preset area, and send a notification message to the V2X parameter configuration network element, wherein the notification message is used to notify that the terminal moves out of the preset area; and
the V2X parameter configuration network element is further configured to send a V2X configuration parameter of the terminal to the mobility management network element, wherein the V2X configuration parameter can be used by the terminal to perform a V2X service outside the preset area.

12. The system according to claim 11, wherein the preset area is a public land mobile network (PLMN) of the terminal.

13. The system according to claim 8, wherein the V2X configuration parameter comprises a parameter used for V2X communication over PC5.

14. The system according to claim 8, wherein registration request message carries the capability indication information.

15. A communication apparatus mobility management network element, comprising:
   a memory storage comprising instructions; and
   one or more processors in communication with the memory storage, wherein the one or more processors execute the instructions to:
   receive a registration request message from a terminal;
   send a parameter request message to a vehicle to everything (V2X) parameter configuration network element based on the registration request message, wherein the parameter request message carries capability indication information used to indicate that the terminal supports V2X communication over PC5 and wherein the parameter request message is used to request a V2X configuration parameter of the terminal from the V2X parameter configuration network element, wherein the V2X parameter configuration network element is a control plane network element deployed by a network operator and is a policy and charging function element;
   receive the V2X configuration parameter from the V2X parameter configuration network element; and
   send the V2X configuration parameter to the terminal, wherein the V2X configuration parameter is used by the terminal to perform a V2X service.

16. The apparatus according to claim 15, wherein the one or more processors are configured to:
   in case that the terminal is authorized to use the V2X service, send the parameter request message to the V2X parameter configuration network element.

17. The apparatus according to claim 15, wherein the one or more processors are configured to:
   send location information of the terminal to the V2X parameter configuration network element, wherein the location information is used by the V2X parameter configuration network element to determine the V2X configuration parameter of the terminal.

18. The apparatus according to claim 15, wherein the one or more processors are configured to:
   determine, based on location information of the terminal, that the terminal moves out of a preset area; and
   send a notification message to the V2X parameter configuration network element, wherein the notification message can be used to notify that the terminal moves out of the preset area.

19. The apparatus according to claim 18, wherein the preset area is a public land mobile network (PLMN) of the terminal.

20. The apparatus according to claim 15, wherein registration request message carries the capability indication information.

* * * * *

UNITED STATES PATENT AND TRADEMARK OFFICE
CERTIFICATE OF CORRECTION

PATENT NO. : 11,800,481 B2
APPLICATION NO. : 16/988927
DATED : October 24, 2023
INVENTOR(S) : Jiangwei Ying et al.

It is certified that error appears in the above-identified patent and that said Letters Patent is hereby corrected as shown below:

In the Claims

In Column 39, Line 37, in Claim 2, delete "element" and insert -- element, --.

In Column 40, Line 43, in Claim 9, delete "a," and insert -- a --.

Signed and Sealed this
Sixteenth Day of January, 2024

Katherine Kelly Vidal
*Director of the United States Patent and Trademark Office*